US012761799B2

(12) United States Patent
Shetty et al.

(10) Patent No.: US 12,761,799 B2
(45) Date of Patent: Oct. 13, 2026

(54) MEMORY REFRESH RATE BASED THROTTLING SCHEME IMPLEMENTATION

(71) Applicant: QUALCOMM Incorporated, San Diego, CA (US)

(72) Inventors: Prathviraj Shetty, Bangalore (IN); Srikar Karnam Venkat Naga, Bangalore (IN); Pranav Agrawal, Hyderabad (IN); Pankaj Kumar Sharma, Bangalore (IN); Louis Louie, San Diego, CA (US); Amod Kumar, Darbhanga (IN); Shekar Babu Merla, Bangalore (IN); Odelu Kukatla, Hyderabad (IN); Ravi Teja Mandavilli, Bangalore (IN); Anshul Verma, Bhilai (IN); Sampath Kumar Kulasekara, Bangalore (IN); Sudhakar Chakali, Bangalore (IN); Rajkumar Hariharan, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/145,251

(22) Filed: Dec. 22, 2022

(65) Prior Publication Data

US 2024/0211141 A1 Jun. 27, 2024

(51) Int. Cl.
*G06F 3/06* (2006.01)

(52) U.S. Cl.
CPC .......... *G06F 3/0613* (2013.01); *G06F 3/0629* (2013.01); *G06F 3/0673* (2013.01)

(58) Field of Classification Search
CPC ..... G06F 3/0613; G06F 3/0629; G06F 3/0673
See application file for complete search history.

(56) References Cited

U.S. PATENT DOCUMENTS

| | | | | |
|---|---|---|---|---|
| 5,533,175 | A * | 7/1996 | Lung | G06K 15/00 358/1.15 |
| 8,207,977 | B1 * | 6/2012 | Kumar | G09G 5/36 345/519 |
| 10,998,032 | B2 * | 5/2021 | Elias | G11C 11/40611 |
| 2016/0350152 | A1 * | 12/2016 | Gadelrab | G06F 9/4887 |

(Continued)

OTHER PUBLICATIONS

Western Digital, "CPU Bandwidth—The Worrisome2020 Trend", Mar. 23, 2016 https://blog.westerndigital.com/cpu-bandwidth-the-worrisome-2020-trend/ (Year: 2016).*

*Primary Examiner* — Brian R Peugh
(74) *Attorney, Agent, or Firm* — Muncy, Geissler, Olds & Lowe, P.C.

(57) ABSTRACT

Various embodiments include methods for controlling memory utilization to accommodate changes in memory accessibility due to memory refreshes include controlling bandwidth of at least one processor based on a refresh rate of a memory. Some embodiments may include receiving the refresh rate of the memory at a memory controller, and determining whether the refresh rate of the memory violates a high or low memory refresh rate threshold, sending an instruction configured to reduce or restore the bandwidth of the at least one processor in response to the determination. In some embodiments the methods may be performed by a quality of service manager, which may be part of a memory controller.

30 Claims, 11 Drawing Sheets

(56) References Cited

U.S. PATENT DOCUMENTS

| | | | | |
|---|---|---|---|---|
| 2017/0344299 | A1* | 11/2017 | Ivanov | B60W 30/09 |
| 2021/0263574 | A1* | 8/2021 | Berke | G11C 5/04 |
| 2021/0406147 | A1* | 12/2021 | Li | G06F 11/3409 |
| 2022/0382465 | A1* | 12/2022 | Maddah | G06F 3/0619 |

* cited by examiner

MEMORY REFRESH RATE BASED THROTTLING SCHEME IMPLEMENTATION

BACKGROUND

Real time processors have time sensitive requirements for execution, such as processing latency thresholds. When the time sensitive requirements are violated, the real time processors will not function as required. One cause for the time sensitive requirements of the real time processors being violated is high utilization of a shared memory by other processors. High utilization causes significant stress/load on memory devices (e.g., DRAM) causing increased power/thermal dissipation. DRAM needs an increased DRAM refresh rate for its memory cells to retain content as temperature increases due to high utilization. The increased DRAM refresh rate would decrease memory access speed, which increases likelihood of violation of time sensitive requirements for real time processors. Current utilization mitigation techniques rely on reducing clock frequencies for the other processors to reduce utilization of the shared memory by other processors. Reduced clock frequencies are insufficient when the other processors are configured as best effort processors, as a best effort processor can still cause significant enough traffic to the shared memory causing violation of the time sensitive requirements of the real time processors. Reduced clock frequencies are insufficient when the other processors concurrently cause traffic cause significant enough traffic to the shared memory causing violation of the time sensitive requirements of the real time processors.

SUMMARY

Various aspects include apparatuses and methods implemented on a system on chip (SoC) for memory utilization control. Aspects may include controlling bandwidth of at least one processor based on a refresh rate of a memory.

Some aspects may include receiving the refresh rate of the memory at a memory controller, and determining whether the refresh rate of the memory violates a high memory refresh rate threshold, in which controlling the bandwidth of the at least one processor based on the refresh rate of the memory includes sending, by a quality of service manager, an instruction configured to reduce the bandwidth of the at least one processor in response to determining that the refresh rate of the memory violates the high memory refresh rate threshold.

In some aspects, controlling the bandwidth of the at least one processor based on the refresh rate of the memory further includes sending a high memory refresh rate interrupt from the memory controller in response to determining that the refresh rate of the memory violates the high memory refresh rate threshold, and sending, by one of the at least one processor, an instruction configured to reduce the bandwidth of the at least one processor in response to the high memory refresh rate interrupt, in which sending, by the quality of service manager, the instruction configured to reduce the bandwidth of the at least one processor includes sending, by the quality of service manager, the instruction configured to reduce the bandwidth of the at least one processor in response to the instruction to reduce the bandwidth of the at least one processor from the one of the at least one processor.

In some aspects, controlling the bandwidth of the at least one processor based on the refresh rate of the memory further includes sending a high memory refresh rate interrupt from the memory controller in response to determining that the refresh rate of the memory violates the high memory refresh rate threshold, in which sending the instruction configured to reduce the bandwidth of the at least one processor includes sending the instruction configured to reduce the bandwidth of the at least one processor in response to the high memory refresh rate interrupt.

Some aspects may further include receiving the refresh rate of the memory at a memory controller, and determining whether the refresh rate of the memory achieves a low memory refresh rate threshold, in which controlling the bandwidth of the at least one processor based on the refresh rate of the memory may include sending, by a quality of service manager, an instruction configured to restore the bandwidth of the at least one processor in response to determining that the refresh rate of the memory achieves the low memory refresh rate threshold.

In some aspects, controlling the bandwidth of the at least one processor based on the refresh rate of the memory further includes sending a low memory refresh rate interrupt from the memory controller in response to determining that the refresh rate of the memory achieves the low memory refresh rate threshold, and sending, by one of the at least one processor, an instruction configured to restore the bandwidth of the at least one processor in response to the low memory refresh rate interrupt, in which sending, by the quality of service manager, the instruction configured to restore the bandwidth of the at least one processor includes sending, by the quality of service manager, the instruction configured to restore the bandwidth of the at least one processor in response to the instruction to restore the bandwidth of the at least one processor from the one of the at least one processor.

In some aspects, controlling the bandwidth of the at least one processor based on the refresh rate of the memory further includes sending a low memory refresh rate interrupt from the memory controller in response to determining that the refresh rate of the memory achieves the low memory refresh rate threshold, in which sending the instruction configured to restore the bandwidth of the at least one processor includes sending the instruction configured to restore the bandwidth of the at least one processor in response to the low memory refresh rate interrupt.

In some aspects, controlling the bandwidth of the at least one processor based on the refresh rate of the memory further includes determining whether a high temperature interrupt is set, and sending a low memory refresh rate interrupt from the memory controller in response to determining that the refresh rate of the memory achieves the low memory refresh rate threshold and that the high temperature interrupt is set.

Further aspects include computing devices including a plurality of processors configured to perform operations of any of the methods summarized above. Further aspects include computing devices having means for performing any of the functions of the methods summarized above. Further aspects include a power management integrated circuit configured to perform any of the methods summarized above.

BRIEF DESCRIPTION OF THE DRAWINGS

The accompanying drawings, which are incorporated herein and constitute part of this specification, illustrate example embodiments of various embodiments, and together with the general description given above and the detailed description given below, serve to explain the features of the claims.

DETAILED DESCRIPTION

Figure 1:
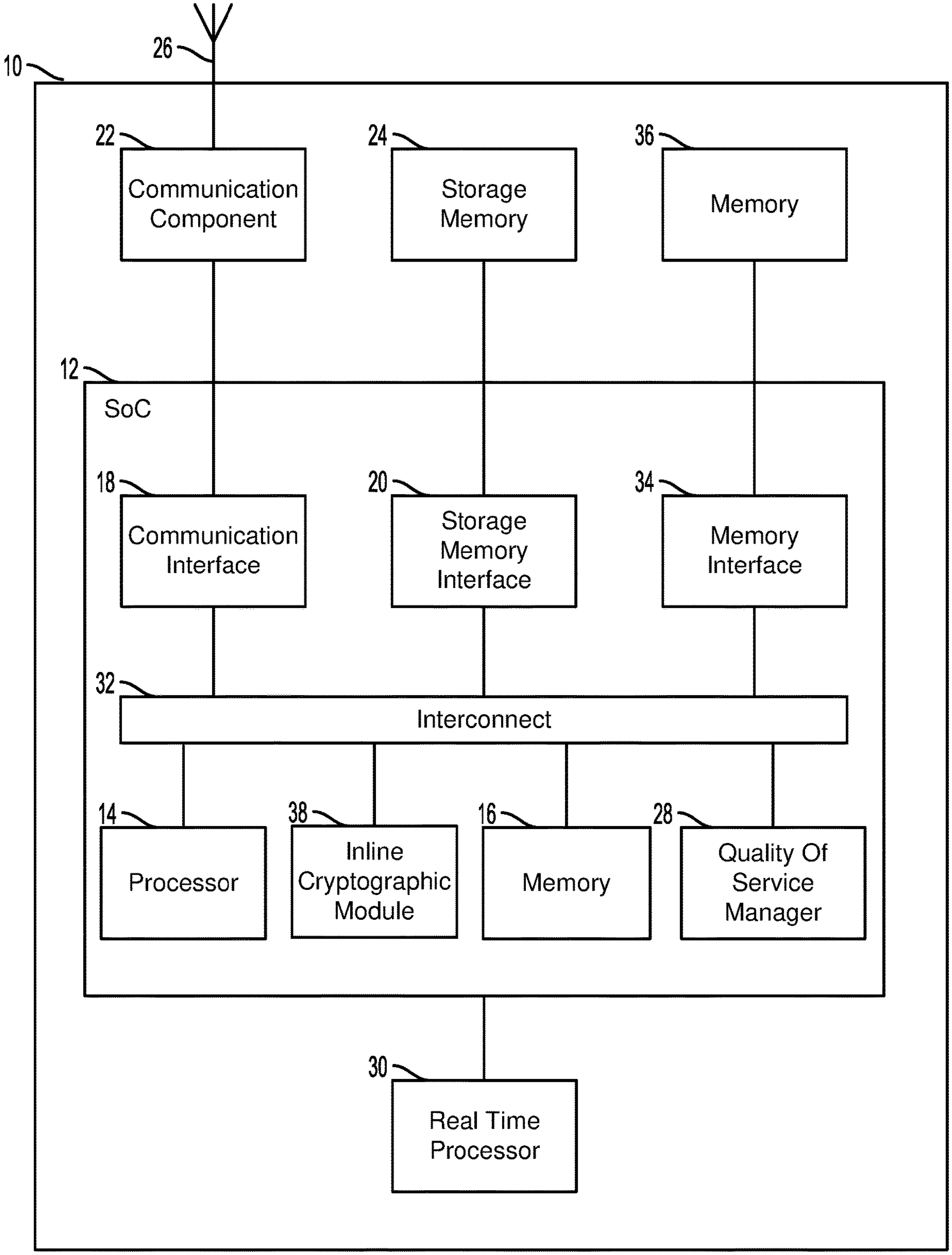
FIG. 1 is a component block diagram illustrating an example computing device suitable for implementing various embodiments.

The various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the claims.

Various embodiments include methods, and computing devices using such methods, for implementing memory utilization control in a system on chip (SoC) by controlling bandwidth of at least one processor based on a refresh rate of a memory. In some embodiments, a processor may receive a high memory refresh rate interrupt from a memory controller and, in response, send a quality of service manager an instruction to reduce the bandwidth of the at least one processor. The quality of service manager may send an instruction configured to reduce the bandwidth of the at least one processor. In some embodiments, the quality of service manager may receive the high memory refresh rate interrupt from the memory controller and, in response, send the instruction configured to reduce the bandwidth of the at least one processor.

The terms "computing device" and "mobile device" are used interchangeably herein to refer to any one or all of cellular telephones, smartphones, personal or mobile multimedia players, personal data assistants (PDA's), laptop computers, tablet computers, convertible laptops/tablets (2-in-1 computers), smartbooks, ultrabooks, netbooks, palm-top computers, wireless electronic mail receivers, multimedia Internet enabled cellular telephones, wearable devices, mobile gaming consoles, wireless gaming controllers, XR devices (including virtual reality, augmented reality, etc. devices), and similar personal electronic devices that include a memory, and a programmable processor. The term "computing device" may further refer to stationary computing devices including personal computers, desktop computers, all-in-one computers, workstations, super computers, mainframe computers, embedded computers, servers, home theater computers, game consoles, internet of things (IoT) devices. The term "computing device" may further refer to embedded computing devices, such as various subsystems of vehicles, including navigation subsystems, infotainment subsystems, imaging subsystems, neural network subsystems, communication subsystems, etc.

Real time processors have time sensitive requirements for execution, such as processing latency thresholds. When the time sensitive requirements are violated, the real time processors will not function as required. One cause for the time sensitive requirements of the real time processors being violated is high utilization of a shared memory by other processors. Time sensitive requirements may also occur when a memory (e.g., a shared memory) increases the rate at which the memory is refreshed to maintain stored data, which may happen as the temperature of the memory increases. Current utilization mitigation techniques rely on reducing clock frequencies of processors to reduce utilization of the shared memory by other processors. Reducing clock frequencies are insufficient when the other processors are configured as best effort processors, because a best effort processor can still cause enough traffic to the shared memory to cause violation of the time sensitive requirements of the real time processors. Reduced clock frequencies are insufficient when the other processors concurrently cause traffic to the shared memory significant enough to cause violation of time sensitive requirements of the real time processors. Such utilization mitigation techniques are based on ambient temperature of an SoC, which can be inaccurate for indicating the temperature at any specific component of the SoC and/or the subject memory of the utilization mitigation techniques.

Various embodiments address and overcome the foregoing problems by controlling bandwidth of at least one processor based on a refresh rate of a memory. By reducing the bandwidth of the at least one processor, the at least one processor may be preempted from causing certain amounts of traffic to the memory, such as traffic exceeding a threshold, including any traffic. Limiting the amount of traffic rather than the rate of the traffic, as in current utilization mitigation techniques, is more effective in controlling the utilization of the memory by the at least one processor as the utilization may be capped, ensuring a certain level of accessibility and/or availability of the memory for areal time processors. Basing memory utilization control on the refresh rate of the memory rather than ambient temperature at the SoC provides a more accurate indication of the utilization of the memory on which to make determinations on when and/or by how much to reduce the bandwidth of the at least one processor. Thus, basing memory utilization control on the refresh rate of the memory is more effective at controlling the utilization of the memory basing memory utilization control based on ambient temperature at the SoC, as in current utilization mitigation techniques.

FIG. 1 illustrates a system including a computing device 10 suitable for use with various embodiments. The computing device 10 may include a system-on-chip (SoC) 12 with a processor 14, a memory 16, a memory interface 34, an inline cryptographic module 38, a communication interface 18, a storage memory interface 20, a quality of service manager 28, and an interconnect 32. The computing device 10 may further include a communication component 22, such as a wired or wireless modem, a storage memory 24, an antenna 26 for establishing a wireless communication link, a real time processor 30, and a memory 36. The processor 14 may include any of a variety of processing devices, for example a number of processor cores.

The term "system-on-chip" (SoC) is used herein to refer to a set of interconnected electronic circuits typically, but not exclusively, including a processing device, a memory, and a communication interface. A processing device may include a variety of different types of processors 14, real time processors 30, and processor cores, such as a general purpose processor, a central processing unit (CPU), a digital signal processor (DSP), a graphics processing unit (GPU), an accelerated processing unit (APU), a secure processing unit (SPU), neural network processing unit (NPU), a subsystem processor of specific components of the computing device, such as an image processor for a camera subsystem or a display processor for a display, an auxiliary processor, a single-core processor, a multicore processor, a controller, and a microcontroller. A processing device may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

An SoC 12 may include one or more processors 14. The computing device 10 may include more than one SoC 12, thereby increasing the number of processors 14 and processor cores. The computing device 10 may also include processors 14 that are not associated with an SoC 12. The processors 14 may each be configured for specific purposes that may be the same as or different from other processors 14 of the computing device 10. One or more of the processors 14 and processor cores of the same or different configurations may be grouped together. A group of processors 14 or processor cores may be referred to as a multi-processor cluster.

The computing device 10 may include any number and combination of memories, such as the memory 16 integral to the SoC 12 and the memory 36 separate from the SoC 12. Any of the memories 16, 36 may be a volatile or non-volatile memory configured for storing data and processor-executable code for access by the processor 14. The computing device 10 and/or SoC 12 may include one or more memories 16, 36 configured for various purposes. One or more memories 16, 36 may include volatile memories such as random access memory (RAM) or main memory, including static RAM (SRAM), such as the memory 16, dynamic RAM (DRAM), such as the memory 36, or cache memory.

The memories 16, 36 may be configured to temporarily store a limited amount of data. For example, the data may be received from a data sensor or subsystem. As another example, the data may be data and/or processor-executable code instructions that are requested from a non-volatile memory 16, 24, 36 loaded to the memories 16, 36 from the non-volatile memory 16, 24, 36 in anticipation of future access based on a variety of factors. As another example, the data may be intermediary processing data and/or processor-executable code instructions produced by the processor 14 and temporarily stored for future quick access without being stored in non-volatile memory 16, 24, 36.

The memory interface 34 may work in unison with the memory 36 to enable the computing device 10 to store and retrieve data and processor-executable code on and from the memory 36. The memory interface 34 may control access to the storage memory 36 and allow the processor 14 to read data from and write data to the memory 36.

The storage memory interface 20 and the storage memory 24 may work in unison to allow the computing device 10 to store data and processor-executable code on a non-volatile storage medium, such as a nonvolatile memory device. The storage memory 24 may be configured much like an embodiment of the memory 16 in which the storage memory 24 may store the data or processor-executable code for access by one or more of the processors 14. The storage memory 24, being non-volatile, may retain the information after the power of the computing device 10 has been shut off. When the power is turned back on and the computing device 10 reboots, the information stored on the storage memory 24 may be available to the computing device 10. The storage memory interface 20 may control access to the storage memory 24 and allow the processor 14 to read data from and write data to the storage memory 24.

The quality of service manager 28 may be configured to configure resources, such as power, frequency, bandwidth, etc., for the processor 14. In some embodiments, the quality of service manager 28 may be preconfigured with values for configuring the resources for the processor 14 based on various criteria, such as a refresh rate of the memory 16, 36. In some embodiments, the quality of service manager 28 may be configured with algorithms for calculating values for configuring the resources for the processor 14 based on various criteria, such as a refresh rate of the memory 16, 36. The quality of service manager 28 may be configured to provide instructions for configuring the resources for the processor 14 to other components of the SoC (not shown) configured to implement the configurations of the resources for the processor 14, such as a power management integrated circuit (PMIC), a clock controller, and/or a bandwidth manager.

The interconnect 32 may be a communication fabric, such as a communication bus, configured to communicatively connect the components of the SoC 12. The interconnect 32 may transmit signals between the components of the SoC 12. In some embodiments, the interconnect 32 may be configured to control signals between the components of the SoC 12 by controlling timing and/or transmission paths of the signals.

The real time processor 30 may be implemented for time sensitive or critical operations of the computing device 10. For example, the real time processor 30 may be implemented in live production systems, safety critical systems, live communication systems, etc. In some embodiments, the real time processor 30 may be implemented as a standalone component of the computing device 10 and/or as a component of a subsystem of the computing device 10. For example, the real time processor 30 may be implemented as a modem DSP of an SoC 12 for a modem subsystem of the computing device 10.

Some or all of the components of the computing device 10 and/or the SoC 12 may be arranged differently and/or combined while still serving the functions of the various embodiments. The computing device 10 may not be limited to one of each of the components, and multiple instances of each component may be included in various configurations of the computing device 10.

Figure 2A:
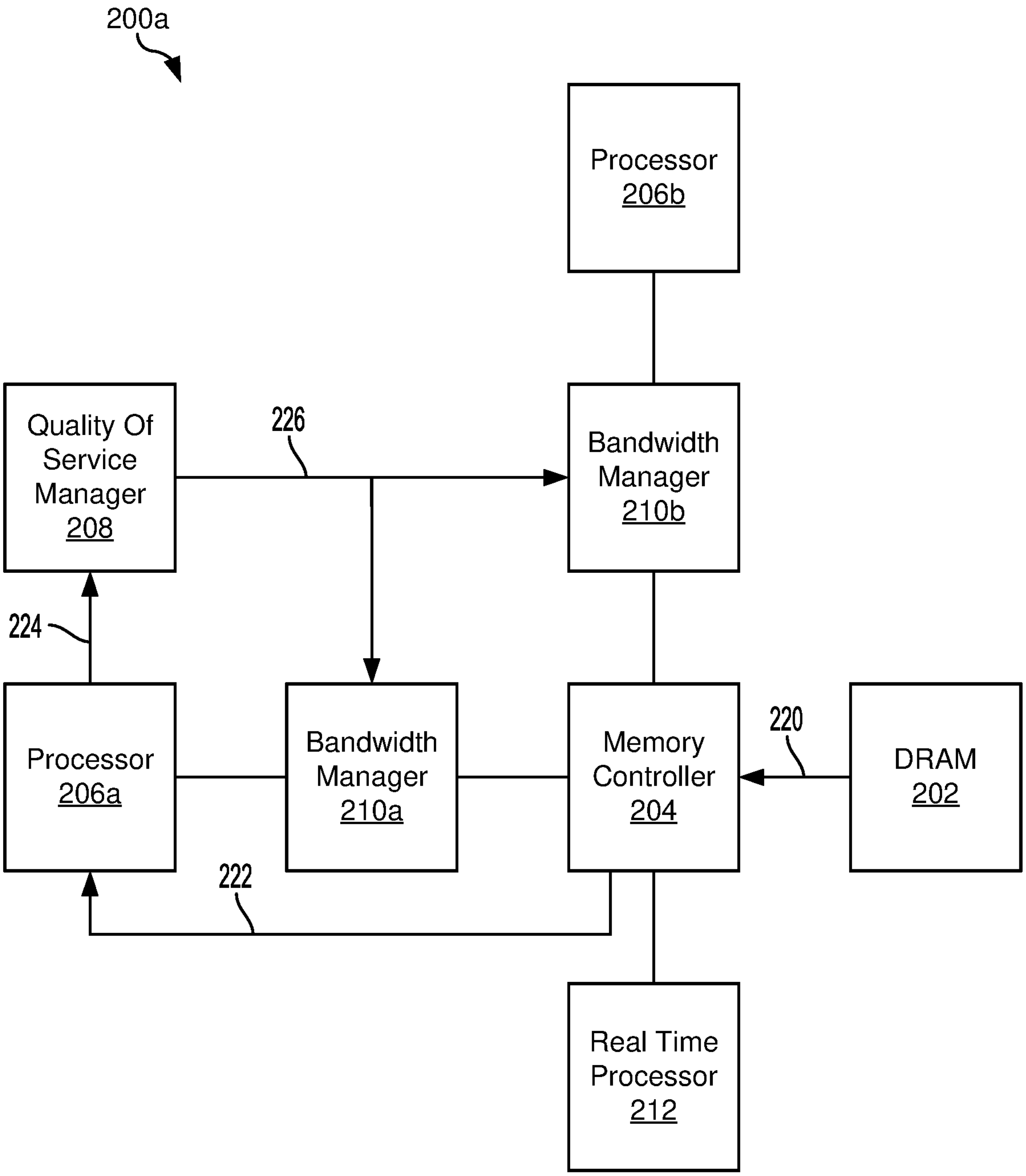
FIGS. 2A and 2B are component block diagrams illustrating examples memory utilization control systems suitable for implementing various embodiments.
Figure 2B:
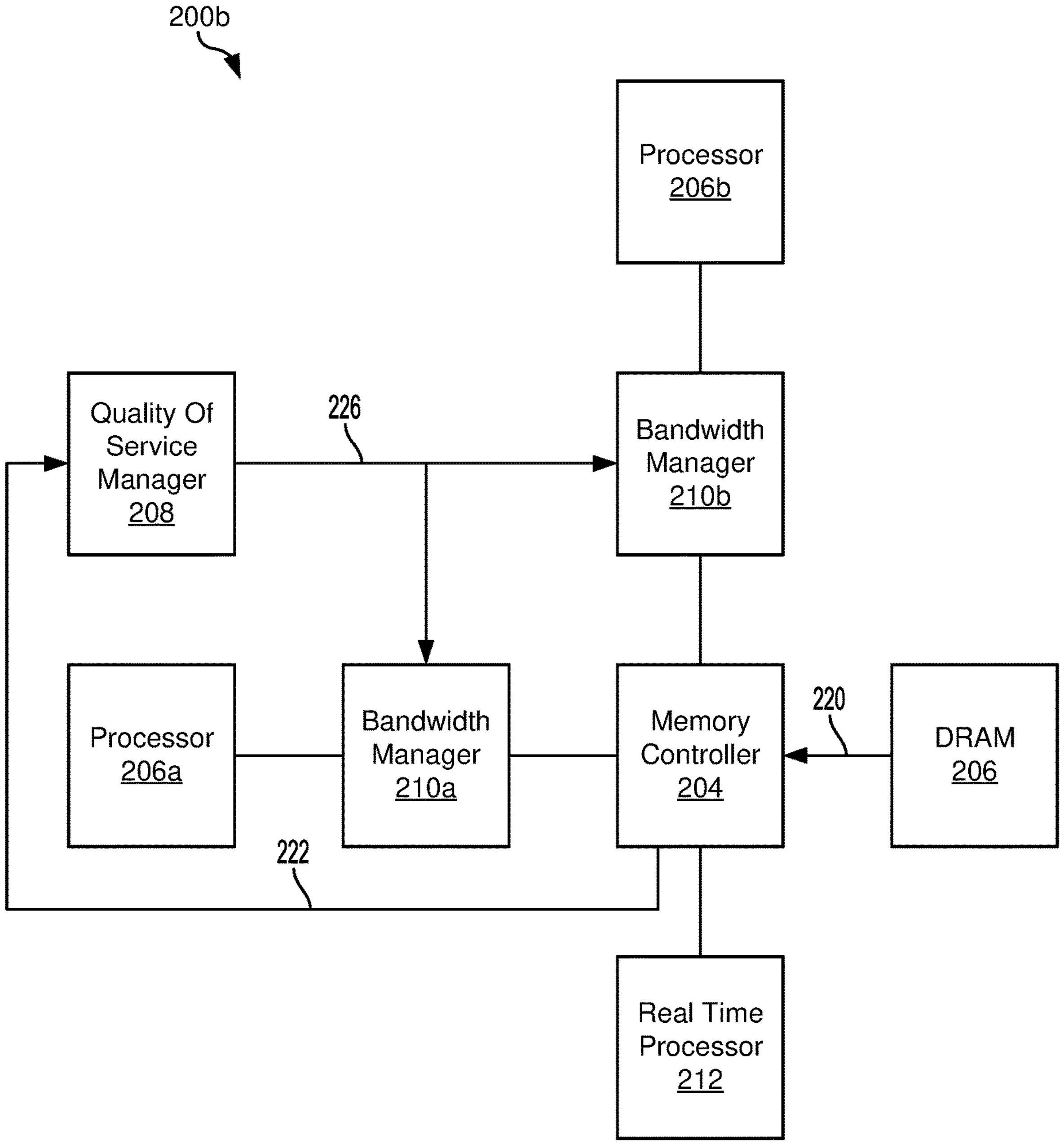

FIGS. 2A and 2B illustrate examples memory utilization control systems 200*a*, 200*b* suitable for implementing various embodiments. With reference to FIGS. 1 and 2, the memory utilization control systems 200*a*, 200*b* may include a memory controller 204 (e.g., memory interface 34 in FIG. 1), memory 202 (e.g., memory 16, 36 in FIG. 1), such as a DRAM, multiple processors 206*a*, 206*b* (e.g., processor 14 in FIG. 1), a quality of service manager 208 (e.g., quality of service manager 28 in FIG. 1), at least one bandwidth manager 210*a*, 210*b*, and at least one real time processor 212 (e.g., real time processor 30 in FIG. 1). Any combination of the components of the memory utilization control systems 200*a*, 200*b* may be communicably connected via various communication buses on which the components may transmit and/or receive communication signals between each other.

The memory controller 204 may poll the memory 202 for a refresh rate of the memory. In response to polling the memory 202, the memory controller 204 may receive the refresh rate of the memory 202 via a poll response 220. The memory controller 204 may be configured with software and/or hardware for generating and sending interrupts 222 based on the refresh rate of the memory 202. The configuration of the memory controller 204 may include comparing the refresh rate of the memory 202 to a high memory refresh rate threshold, and generating and sending a high memory refresh rate interrupt 222 in response to the refresh rate of the memory 202 violating the high memory refresh rate threshold.

The high memory refresh rate threshold may be any refresh rate greater than a base refresh rate for active or normal operation of the memory 202, such as two times, four times, etc. the base refresh rate. Violating the high memory refresh rate threshold may include meeting and/or exceeding the high memory refresh rate threshold.

The high memory refresh rate interrupt 222 may be configured to trigger the recipient to implement a portion of a process for reducing bandwidths of the processors 206*a*, 206*b*. In some embodiments, the high memory refresh rate interrupt 222 may include an indication of the memory refresh rate and/or an indication of a degree by which the memory refresh rate violates the high memory refresh rate threshold.

The configuration of the memory controller 204 may include comparing the refresh rate of the memory 202 to a low memory refresh rate threshold, and generating and sending a low memory refresh rate interrupt 222 in response to the refresh rate of the memory 202 achieving the low memory refresh rate threshold. A low memory refresh rate threshold may be any refresh rate less than a maximum refresh rate for operation of the memory 202, such as one times, two times, four times, etc. the base refresh rate. Achieving the low memory refresh rate threshold may include meeting and/or falling short of the low memory refresh rate threshold. The low memory refresh rate interrupt 222 may be configured to trigger a recipient to implement a portion of a process for restoring bandwidths of the processors 206*a*, 206*b*. The process for restoring bandwidths of the processors 206*a*, 206*b* may include restoring previously reduced bandwidths of the processors 206*a*, 206*b* at least partially, up to completely, to bandwidths greater than the reduced bandwidths, including up to maximum bandwidths. In some embodiments, the low memory refresh rate interrupt 222 may include an indication of the memory refresh rate and/or an indication of a degree by which the memory refresh rate achieves the low memory refresh rate threshold.

In some embodiments, one or more other memory refresh rate thresholds may be any refresh rates less than the high memory refresh rate threshold and greater than the low memory refresh rate threshold. The configuration of the memory controller 204 may include comparing the refresh rate of the memory 202 to the one or more memory refresh rate thresholds. In response to violating and/or achieving the one or more memory refresh rate thresholds, the configuration of the memory controller 204 may include generating and sending a memory refresh rate interrupt (not shown) configured to trigger the recipient to implement a portion of a process for reducing bandwidths of the processors 206*a*, 206*b* and/or to implement a portion of a process for restoring bandwidths of the processors 206*a*, 206*b*.

In some embodiments, the memory controller 204 may be configured to compare a temperature value, such as a temperature value at the memory controller 204, an ambient temperature value of the SoC (e.g., SoC 12 in FIG. 1), etc. to a temperature threshold. The memory controller 204 may compare the refresh rate of the memory 202 to the low memory refresh rate threshold in response to determining that the temperature value meets and/or falls short of the temperature threshold.

With reference to FIG. 2A and the memory utilization control system 200*a*, the processor 206*a* may receive the interrupt 222 from the memory controller 204. In some embodiments, the processor 206*a* may be a CPU, and application processor, etc. The processor 206*a* may be configured with software for interpreting the interrupt 222, and generating and sending an instruction 224 to control the bandwidths of the processors 206*a*, 206*b*.

In response to receiving the high memory refresh rate interrupt 222, the processor 206*a* may generate and send, to the quality of service manager 208, an instruction 224 to reduce the bandwidths of the processors 206*a*, 206*b*. In some embodiments, the instruction 224 to reduce the bandwidths of the processors 206*a*, 206*b* may include an indication of the memory refresh rate, an indication of a degree by which the memory refresh rate violates the high memory refresh rate threshold, an indication of a level to which the bandwidths of the processors 206*a*, 206*b* should be reduced, and/or a degree by which to reduce the bandwidths of the processors 206*a*, 206*b*.

In response to receiving the low memory refresh rate interrupt 222, the processor 206*a* may generate and send, to the quality of service manager 208, an instruction 224 to restore the bandwidths of the processors 206*a*, 206*b*. In some embodiments, the instruction 224 to restore the bandwidths of the processors 206*a*, 206*b* may include an indication of the memory refresh rate, an indication of a degree by which the memory refresh rate achieves the low memory refresh rate threshold, an indication of a level to which the bandwidths of the processors 206*a*, 206*b* should be restored, and/or a degree by which to restore the bandwidths of the processors 206*a*, 206*b*. The instruction 224 to restore the bandwidths of the processors 206*a*, 206*b* may indicate restoring previously reduced bandwidths of the processors 206*a*, 206*b* at least partially, up to completely, to bandwidths greater than the reduced bandwidths, including up to maximum bandwidths.

The quality of service manager 208 may receive the instruction 224 to control the bandwidths of the processors 206*a*, 206*b* from the processor 206*a*. The quality of service manager 208 may be configured with hardware for interpreting the instruction 224 to control the bandwidths of the processors 206*a*, 206*b*, and generating and sending an instruction 226 to configure the bandwidths of the processors 206*a*, 206*b*. In some embodiments, the quality of service manager 208 may be preconfigured with values for configuring the bandwidths for the processors 206*a*, 206*b* based on the indications of the instruction 224 to control the bandwidths of the processors 206*a*, 206*b*. In some embodiments, the quality of service manager 208 may be configured with algorithms for configuring the bandwidths for the processors 206*a*, 206*b* based on the indications of the instruction 224 to control the bandwidths of the processors 206*a*, 206*b*.

In response to receiving the instruction 224 to reduce the bandwidths of the processors 206*a*, 206*b*, the quality of service manager 208 may generate and send, to the at least one bandwidth manager 210*a*, 210*b*, an instruction 226 to configure reducing the bandwidths of the processors 206*a*, 206*b*. In some embodiments, the instruction 226 to configure reducing the bandwidths of the processors 206*a*, 206*b* may include an indication of a level to which the bandwidths of the processors 206*a*, 206*b* should be reduced, a degree by which to reduce the bandwidths of the processors 206*a*, 206*b*, and/or when to reduce the bandwidths of the processors 206*a*, 206*b*.

In response to receiving the instruction 224 to restore the bandwidths of the processors 206*a*, 206*b*, the quality of service manager 208 may generate and send, to the at least one bandwidth manager 210*a*, 210*b*, an instruction 226 to configure restoring the bandwidths of the processors 206*a*, 206*b*. In some embodiments, the instruction 226 to configure restoring the bandwidths of the processors 206*a*, 206*b* may include an indication of a level to which the bandwidths of the processors 206*a*, 206*b* should be restored, a degree by which to restore the bandwidths of the processors 206*a*, 206*b*, and/or when to restore the bandwidths of the processors 206*a*, 206*b*. The instruction 226 to configure restoring the bandwidths of the processors 206*a*, 206*b* may indicate restoring previously reduced bandwidths of the processors 206*a*, 206*b* at least partially, up to completely, to bandwidths greater than the reduced bandwidths, including up to maximum bandwidths.

Referring to FIG. 2B and the memory utilization control system 200*b*, the quality of service manager 208 may receive the interrupt 222 from the memory controller 204. The quality of service manager 208 may be configured with hardware for interpreting the interrupt 222, and generating and sending the instruction 226 to configure the bandwidths of the processors 206*a*, 206*b*. In some embodiments, the quality of service manager 208 may be preconfigured with values for configuring the bandwidths for the processors 206*a*, 206*b* based on the indications of the interrupt 222. In some embodiments, the quality of service manager 208 may be configured with algorithms for configuring the bandwidths for the processors 206*a*, 206*b* based on the indications of the interrupt 222.

In response to receiving the high memory refresh rate interrupt 222, the quality of service manager 208 may generate and send, to the at least one bandwidth manager 210*a*, 210*b*, an instruction 226 to configure reducing the bandwidths of the processors 206*a*, 206*b*. In some embodiments, the instruction 226 to configure reducing the bandwidths of the processors 206*a*, 206*b* may include an indication of a level to which the bandwidths of the processors 206*a*, 206*b* should be reduced, a degree by which to reduce the bandwidths of the processors 206*a*, 206*b*, and/or when to reduce the bandwidths of the processors 206*a*, 206*b*.

In response to receiving the low memory refresh rate interrupt 222, the quality of service manager 208 may generate and send, to the at least one bandwidth manager 210*a*, 210*b*, an instruction 226 to configure restoring the bandwidths of the processors 206*a*, 206*b*. In some embodiments, the instruction 226 to configure restoring the bandwidths of the processors 206*a*, 206*b* may include an indication of a level to which the bandwidths of the processors 206*a*, 206*b* should be restored, a degree by which to restore the bandwidths of the processors 206*a*, 206*b*, and/or when to restore the bandwidths of the processors 206*a*, 206*b*. The instruction 226 to configure restoring the bandwidths of the processors 206*a*, 206*b* may indicate restoring previously reduced bandwidths of the processors 206*a*, 206*b* at least partially, up to completely, to bandwidths greater than the reduced bandwidths, including up to maximum bandwidths.

Referring to FIGS. 2A and 2B and the memory utilization control systems 200*a*, 200*b*, the at least one bandwidth manager 210*a*, 210*b* may receive the instruction 226 to configure the bandwidths of the processors 206*a*, 206*b*. The at least one bandwidth manager 210*a*, 210*b* may be configured with hardware for interpreting the instruction 226 to configure the bandwidths of the processors 206*a*, 206*b*, and configuring the bandwidths of the processors 206*a*, 206*b*. In response to receiving the instruction 226 to configure reducing the bandwidths of the processors 206*a*, 206*b*, the at least one bandwidth manager 210*a*, 210*b* may generate and send a signal, to the processors 206*a*, 206*b*, configured to cause the processors 206*a*, 206*b* to stop transmission to the memory 202. In response to receiving the instruction 226 to configure restoring the bandwidths of the processors 206*a*, 206*b*, the at least one bandwidth manager 210*a*, 210*b* may generate and send a signal, to the processors 206*a*, 206*b*, configured to cause the processors 206*a*, 206*b* to start transmission to the memory 202.

The number and combination of components shown in FIGS. 2A and 2B are for illustrative, clarity, and ease of explanation purposes, and are not intended to limit the claims and specification to this number and combination of components. Various embodiments may be implemented using other numbers and combinations of components, such as more processors, more memories, more real time processors, etc.

Figure 3:
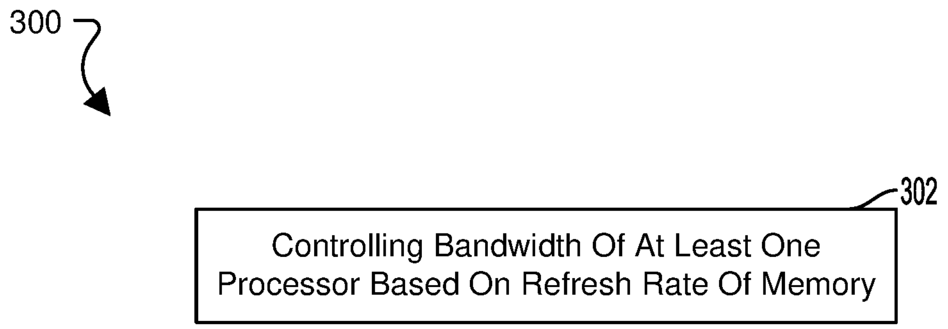
FIG. 3 is a process flows diagram illustrating a method of memory utilization control in the memory utilization control systems according to some embodiments.

FIG. 3 illustrates a method of memory utilization control in a memory utilization control system according to some embodiments. With reference to FIGS. 1-3, the method 300 may be implemented in a computing device (e.g., computing device 10 in FIG. 1), in software executing in a processor (e.g., processor 14, 206*a*, memory controller 204 in FIGS. 1-2B), in general purpose hardware, in dedicated hardware (e.g., memory controller 204, quality of service manager 28, 208, bandwidth manager 210*a*, 210*b* in FIGS. 1-2B), or in a combination of a software-configured processor and dedicated hardware, such as a processor executing software within a memory utilization control system (e.g., memory utilization control system 200*a*, 200*b* in FIGS. 2A and 2B) that includes other individual components, and various memory/cache controllers. In order to encompass the alternative configurations enabled in various embodiments, the hardware implementing the method 300 is referred to herein as an "memory utilization control device."

In block 302, the memory utilization control device may perform operations including controlling bandwidth of at least one processor (e.g., processor 14, 206*a*, 206*b* in FIGS. 1-2B) based on a refresh rate of a memory (e.g., memory 16, 36, 202 in FIGS. 1-2B). Controlling the bandwidth of the at least one processor based on the refresh rate of the memory is described further for the methods 400, 500*a*, 500*b*, 600*a*, 600*b*, 600*c*, 600*d*, 700*a*, 700*b* with reference to FIGS. 4-7B. In some embodiments, the memory utilization control device controlling the bandwidth of the at least one processor based on the refresh rate of the memory in block 302 may be a processor (e.g., processor 14, 206*a*, memory controller 204 in FIGS. 1-2B), a memory controller (e.g., memory interface 14, memory controller 204 in FIGS. 1-2B), a quality of service manager (e.g., quality of service manager 28, 208 in FIGS. 1-2B), and/or bandwidth manager (e.g., bandwidth manager 210*a*, 210*b* in FIGS. 2A and 2B).

Figure 4:
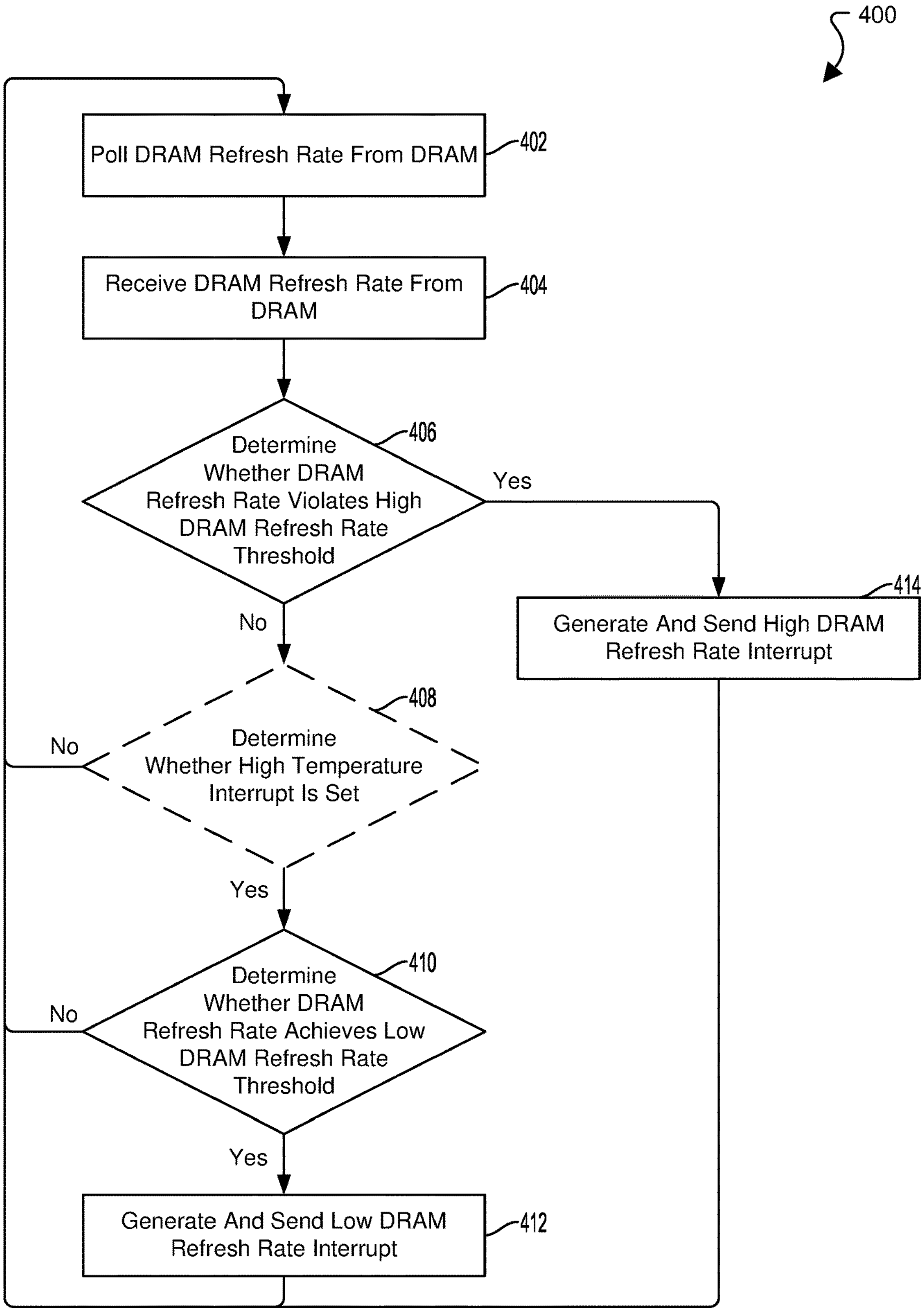
FIG. 4 is a process flow diagram illustrating a method of memory utilization control in a memory controller according to some embodiments.

FIG. 4 illustrates a method of memory utilization control in a memory controller according to some embodiments. With reference to FIGS. 1-4, the method 400 may be implemented in a computing device (e.g., computing device 10 in FIG. 1), in software executing in a processor (e.g., processor 14, 206*a*, memory controller 204 in FIGS. 1-2B), in general purpose hardware, in dedicated hardware (e.g., memory controller 204 in FIGS. 1-2B), or in a combination of a software-configured processor and dedicated hardware, such as a processor executing software within a memory utilization control system (e.g., memory utilization control system 200*a*, 200*b* in FIGS. 2A and 2B) that includes other individual components, and various memory/cache controllers. In order to encompass the alternative configurations enabled in various embodiments, the hardware implementing the method 400 is referred to herein as an "memory utilization control device."

In block 402, the memory utilization control device may perform operations including polling a memory refresh rate from a memory (e.g., DRAM; e.g., memory 16, 36, 202 in FIGS. 1-2B). The memory utilization control device may poll the memory refresh rate from the memory via known means. In some embodiments, the memory utilization control device polling a memory refresh rate from the memory in block 402 may be a memory controller (e.g., memory interface 14, memory controller 204 in FIGS. 1-2B).

In block 404 the memory utilization control device may perform operations including receiving the memory refresh rate from the memory. The memory utilization control device may receive the memory refresh rate from the memory via known means in response to polling the memory refresh rate from the memory. In some embodiments, the memory utilization control device receiving the memory refresh rate from the memory in block 404 may be the memory controller.

In determination block 406, the memory utilization control device may perform operations including determining whether the memory refresh rate violates a high memory refresh rate threshold. The memory utilization control device may perform operations including comparing the refresh rate of the memory to the high memory refresh rate threshold. The high memory refresh rate threshold may be any refresh rate greater than a base refresh rate for active or normal operation of the memory, such as two times, four times, etc. the base refresh rate. Violating the high memory refresh rate threshold may include meeting and/or exceeding the high memory refresh rate threshold. In some embodiments, the memory utilization control device determining whether the memory refresh rate violates the high memory refresh rate threshold in determination block 406 may be the memory controller.

In response to determining that the memory refresh rate violates the high memory refresh rate threshold (i.e., determination block 406="Yes"), the memory utilization control device may perform operations including generating and sending a high memory refresh rate interrupt (high memory refresh rate interrupt 222 in FIGS. 2A and 2B) in block 414. The high memory refresh rate interrupt may be configured to trigger a recipient to implement a portion of a process for reducing bandwidths of at least one processor (e.g., processor 14, 206*a*, 206*b* in FIGS. 1-2B). In some embodiments, the high memory refresh rate interrupt may include an indication of the memory refresh rate and/or an indication of a degree by which the memory refresh rate violates the high memory refresh rate threshold. In some embodiments, the memory utilization control device generating and sending the high memory refresh rate interrupt in block 414 may be the memory controller.

In response to determining that the memory refresh rate does not violate the high memory refresh rate threshold (i.e., determination block 406="No"), the memory utilization control device may perform operations including determining whether a high temperature interrupt is set in optional determination block 408. The memory utilization control device may perform operations including comparing a temperature value, such as a temperature value at the memory controller, an ambient temperature value of an SoC (e.g., SoC 12 in FIG. 1), etc. to a temperature threshold. In response to the temperature value exceeding the temperature threshold, a high temperature interrupt may be set, such as a value in a memory (e.g., memory 16, 36, 202 in FIGS. 1-2B), including a register. The memory utilization control device may perform operations including checking whether the value of the high temperature interrupt indicates to the memory utilization control device that the high temperature interrupt is set. In some embodiments, the memory utilization control device determining whether a high temperature interrupt is set in optional determination block 408 may be the memory controller.

In response to determining that the memory refresh rate does not violate the high memory refresh rate threshold (i.e., determination block 406="No"); or in response determining that the high temperature interrupt is set (i.e., optional determination block 408="Yes"), the memory utilization control device may perform operations including determining whether the memory refresh rate achieves a low memory refresh rate threshold in determination block 410. The memory utilization control device may perform operations including comparing the refresh rate of the memory to the low memory refresh rate threshold. The low memory refresh rate threshold may be any refresh rate less than a maximum refresh rate for operation of the memory, such as one times, two times, four times, etc. the base refresh rate. Achieving the low memory refresh rate threshold may include meeting and/or falling short of the low memory refresh rate threshold. In some embodiments, the memory utilization control device determining whether the memory refresh rate achieves a low memory refresh rate threshold in determination block 410 may be the memory controller.

In response to determining that the memory refresh rate achieves the low memory refresh rate threshold (i.e., determination block 410="Yes"), the memory utilization control device may perform operations including generating and sending a low memory refresh rate interrupt 222 (low memory refresh rate interrupt 222 in FIGS. 2A and 2B) in block 412. The low memory refresh rate interrupt may be configured to trigger a recipient to implement a portion of a process for restoring bandwidths of the at least one processor. Restoring the bandwidths of the at least one processor may include restoring previously reduced bandwidths of the at least one processor at least partially, up to completely, to bandwidths greater than the reduced bandwidths, including up to maximum bandwidths. In some embodiments, the low memory refresh rate interrupt may include an indication of the memory refresh rate and/or an indication of a degree by which the memory refresh rate achieves the low memory refresh rate threshold. In some embodiments, the memory utilization control device generating and sending the low memory refresh rate interrupt in block 412 may be the memory controller.

In response determining that the high temperature interrupt is not set (i.e., optional determination block 408="No");

in response to determining that the memory refresh rate does not achieve the low memory refresh rate threshold (i.e., determination block 410="No"); following generating and sending the low memory refresh rate interrupt in block 412; or following generating and sending the high memory refresh rate interrupt in block 414, the memory utilization control device may perform operations including polling the memory refresh rate from the memory in block 402. In some embodiments, the memory utilization control device polling a memory refresh rate from the memory in block 402 may be the memory controller.

The method 400 described with reference to FIG. 4 includes, but is not limited to, determining whether the memory refresh rate violates the high memory refresh rate threshold in determination block 406 and determining whether the memory refresh rate achieves a low memory refresh rate threshold in determination block 410. In some embodiments, the memory utilization control device may perform operations including one or more determinations whether the memory refresh rate violates and/or achieves one or more memory refresh rate thresholds of any refresh rates less than the high memory refresh rate threshold and greater than the low memory refresh rate threshold.

For example, in response to determining that the memory refresh rate does not violate the high memory refresh rate threshold (i.e., determination block 406="No"), the memory utilization control device may perform operations including determining whether the memory refresh rate violates the one or more low memory refresh rate thresholds in determination block 410 (not performing optional determination block 408).

In response to determining that the memory refresh rate violates the one or more memory refresh rate thresholds (i.e., determination block 406="Yes"), the memory utilization control device may perform operations including generating and sending a memory refresh rate interrupt configured to trigger a recipient to implement a portion of a process for reducing bandwidths of at least one processor in block 414.

In some embodiments, in response to determining that the memory refresh rate does not violate the one or more memory refresh rate thresholds, the memory utilization control device may perform similar operations for others of the one or more memory refresh rate thresholds. In some embodiments, the memory utilization control device determining whether the memory refresh rate violates the one or more memory refresh rate thresholds and generating and sending a memory refresh rate interrupt may be the memory controller.

For example, in response to determining that the memory refresh rate does not violate the high memory refresh rate threshold (i.e., determination block 406="No"); in response to determining that the memory refresh rate violates the one or more memory refresh rate thresholds; or in response determining that the high temperature interrupt is set (i.e., optional determination block 408="Yes"), the memory utilization control device may perform operations including determining whether the memory refresh rate achieves the one or more memory refresh rate thresholds. In response to determining that the memory refresh rate does not achieve the one or more memory refresh rate thresholds, the memory utilization control device may perform operations including continuously, repeatedly, and/or episodically determining whether the memory refresh rate achieves the one or more memory refresh rate thresholds. In response to determining that the memory refresh rate achieves the one or more memory refresh rate thresholds, the memory utilization control device may perform operations including generating and sending a memory refresh rate interrupt configured to trigger a recipient to implement a portion of a process for restoring bandwidths of the at least one processor. The memory utilization control device may perform similar operations for others of the one or more memory refresh rate thresholds and/or determine whether the memory refresh rate achieves a low memory refresh rate threshold in determination block 410. In some embodiments, the memory utilization control device determining whether the memory refresh rate achieves the one or more memory refresh rate thresholds and generating and sending a memory refresh rate interrupt may be the memory controller.

Figure 5A:
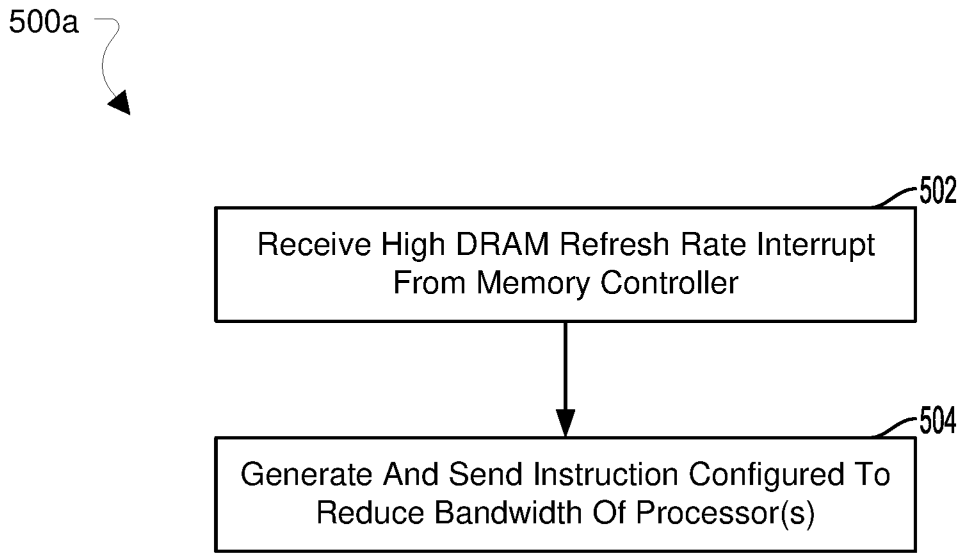
FIGS. 5A and 5B are process flow diagrams illustrating methods of memory utilization control in a processor according to some embodiments.
Figure 5B:
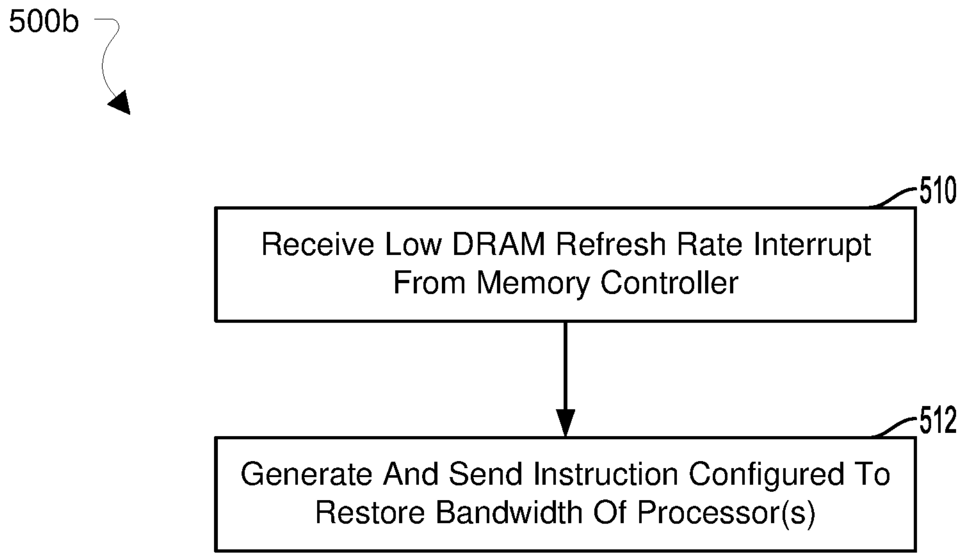

FIGS. 5A and 5B illustrate methods of memory utilization control in a processor according to some embodiments. With reference to FIGS. 1-5B, the methods 500*a*, 500*b* may be implemented in a computing device (e.g., computing device 10 in FIG. 1), in software executing in a processor (e.g., processor 14, 206*a* in FIGS. 1 and 2A), in general purpose hardware, in dedicated hardware, or in a combination of a software-configured processor and dedicated hardware, such as a processor executing software within a memory utilization control system (e.g., memory utilization control system 200*a* in FIG. 2A) that includes other individual components, and various memory/cache controllers. In order to encompass the alternative configurations enabled in various embodiments, the hardware implementing the methods 500*a*, 500*b* is referred to herein as an "memory utilization control device."

With reference to FIG. 5A and the method 500*a*, in block 502 the memory utilization control device may perform operations including receiving a high memory refresh rate interrupt (e.g., high memory refresh rate interrupt 222 in FIG. 2A) from a memory controller (e.g., memory interface 14, memory controller 204 in FIGS. 1 and 2A). The high memory refresh rate interrupt may be the high memory refresh rate interrupt sent in block 414 of the method 400 described herein with reference to FIG. 4. In some embodiments, the memory utilization control device receiving the high memory refresh rate interrupt from the memory controller in block 502 may be a processor (e.g., a CPU, and application processor, etc.; processor 14, 206*a* in FIGS. 1 and 2A).

In block 504 the memory utilization control device may perform operations including generating and sending an instruction (e.g., instruction 224 in FIG. 2A) to reduce a bandwidth of at least one processor (e.g., processor 14, 206*a*, 206*b* in FIGS. 1 and 2A). The memory utilization control device may perform operations including interpreting the high memory refresh rate interrupt, and generating and sending the instruction to reduce the bandwidth of the at least one processor. In some embodiments, the instruction to reduce the bandwidth of the at least one processor may include an indication of the memory refresh rate, an indication of a degree by which the memory refresh rate violates the high memory refresh rate threshold, an indication of a level to which the bandwidth of the at least one processor should be reduced, and/or a degree by which to reduce the bandwidth of the at least one processor. In some embodiments, the memory utilization control device generating and sending the instruction to reduce the bandwidth of the at least one processor in block 504 may be the processor With reference to FIG. 5B and the method 500*b*, in block 510 the memory utilization control device may perform operations including receiving a low memory refresh rate interrupt (e.g., low memory refresh rate interrupt 222 in FIG. 2A) from a memory controller (e.g., memory interface 14, memory controller 204 in FIGS. 1 and 2A). The low memory refresh rate interrupt may be the low memory refresh rate interrupt sent in block 412 of the method 400 described herein with reference to FIG. 4. In some embodiments, the memory utilization control device receiving the low memory refresh rate interrupt from the memory controller in block 510 may be a processor (e.g., a CPU, and application processor, etc.; processor 14, 206*a* in FIGS. 1 and 2A).

In block 512 the memory utilization control device may perform operations including generating and sending an instruction (e.g., instruction 224 in FIG. 2A) to restore a bandwidth of at least one processor (e.g., processor 14, 206*a*, 206*b* in FIGS. 1 and 2A). The memory utilization control device may perform operations including interpreting the low memory refresh rate interrupt, and generating and sending the instruction to restore the bandwidth of the at least one processor. In some embodiments, the instruction to restore the bandwidth of the at least one processor may include an indication of the memory refresh rate, an indication of a degree by which the memory refresh rate achieves the low memory refresh rate threshold, an indication of a level to which the bandwidth of the at least one processor should be restored, and/or a degree by which to restore the bandwidth of the at least one processor. The instruction to restore the bandwidth of the at least one processor may indicate restoring a previously reduced bandwidth of the at least one processor at least partially, up to completely, to a bandwidth greater than the reduced bandwidth, including up to a maximum bandwidth. In some embodiments, the memory utilization control device generating and sending the instruction to restore the bandwidth of the at least one processor in block 512 may be the processor.

FIGS. 6A-6D illustrate methods of memory utilization control in a quality of service manager according to some embodiments. With reference to FIGS. 1-6D, the methods 600*a*, 600*b*, 600*c*, and 600D may be implemented in a computing device (e.g., computing device 10 in FIG. 1), in software executing in a processor (e.g., processor 14, 206*a*, quality of service manager 28, 208 in FIGS. 1-2B), in general purpose hardware, in dedicated hardware (e.g., quality of service manager 28, 208 in FIGS. 2A and 2B), or in a combination of a software-configured processor and dedicated hardware, such as a processor executing software within a memory utilization control system (e.g., memory utilization control system 200*a*, 200*b* in FIGS. 2A and 2B) that includes other individual components, and various memory/cache controllers. In order to encompass the alternative configurations enabled in various embodiments, the hardware implementing the methods 500*a*, 500*b* is referred to herein as an "memory utilization control device."

Figure 6A:
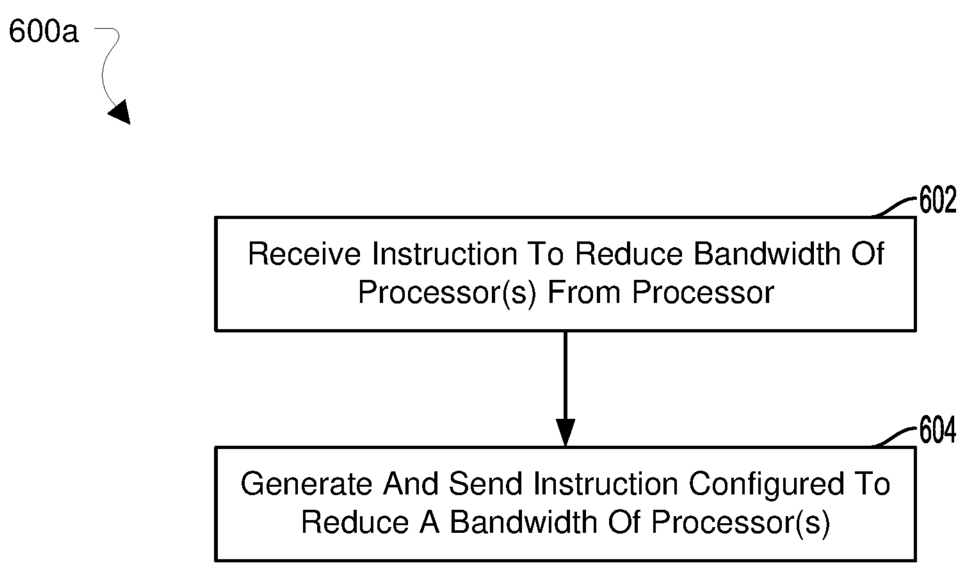
FIGS. 6A-6D are process flow diagrams illustrating methods of memory utilization control in a quality of service manager according to some embodiments.

Referring to FIG. 6A, in block 602 of the method 600*a* the memory utilization control device may perform operations including receiving an instruction (e.g., instruction 224 in FIG. 2A) to reduce a bandwidth of at least one processor (e.g., processor 14, 206*a*, 206*b* in FIGS. 1 and 2A) from a processor (e.g., processor 14, 206*a* in FIGS. 1 and 2A). The instruction to reduce the bandwidth of the at least one processor may be the instruction to reduce the bandwidth of the at least one processor sent in block 504 of the method 500*a* described herein with reference to FIG. 5A. In some embodiments, the memory utilization control device receiving instruction to reduce the bandwidth of the at least one processor from the processor in block 602 may be a quality of service manager (e.g., quality of service manager 28, 208 in FIGS. 1 and 2A).

In block 604, the memory utilization control device may perform operations including generating and sending an instruction (e.g., instruction 226 in FIG. 2A) configured to reduce a bandwidth of at least one processor (e.g., processor 14, 206*a*, 206*b* in FIGS. 1 and 2A). The memory utilization control device may perform operations including interpreting the instruction to reduce the bandwidth of the at least one processor, and generating and sending the instruction configured to reduce the bandwidth of the at least one processor. In some embodiments, the memory utilization control device may be preconfigured with values for configuring the bandwidth for the at least one processor based on the indications of the instruction to control the bandwidth of the at least one processor. In some embodiments, the memory utilization control device may be configured with algorithms for configuring the bandwidth for the at least one processor based on the indications of the instruction to control the bandwidths of the processors.

In response to receiving the instruction to reduce the bandwidth of the at least one processor in block 602, the memory utilization control device may generate and send the instruction configured to reduce the bandwidth of the at least one processor to at least one bandwidth manager (e.g., bandwidth manager 210*a*, 210*b* in FIG. 2A) in block 604. In some embodiments, instructions configured to reduce the bandwidth of the at least one processor may include an indication of a level to which the bandwidth of the at least one processor should be reduced, a degree by which to reduce the bandwidth of the at least one processor, and/or when to reduce the bandwidth of the at least one processor. In some embodiments, the memory utilization control device generating and sending the instruction configured to reduce the bandwidth of the at least one processor in block 604 may be the quality of service manager.

Figure 6B:
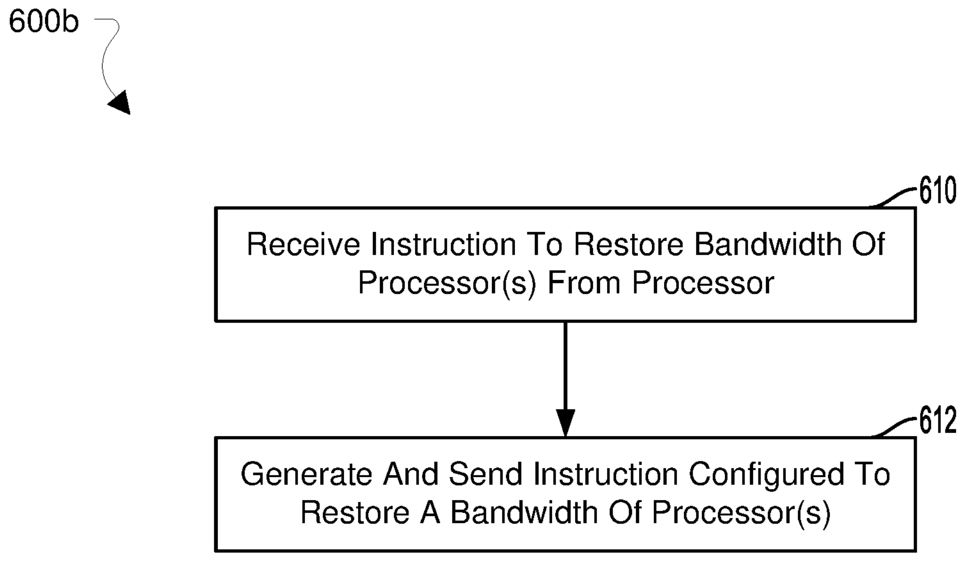

Referring to FIG. 6B, in block 610 of the method 600*b* the memory utilization control device may perform operations including receiving an instruction (e.g., instruction 224 in FIG. 2A) to restore a bandwidth of at least one processor (e.g., processor 14, 206*a*, 206*b* in FIGS. 1 and 2A) from a processor (e.g., processor 14, 206*a* in FIGS. 1 and 2A). The instruction to restore the bandwidth of the at least one processor may be the instruction to restore the bandwidth of the at least one processor sent in block 512 of the method 500*b* described with reference to FIG. 5B. In some embodiments, the memory utilization control device receiving instructions to restore the bandwidth of the at least one processor from the processor in block 610 may be a quality of service manager (e.g., quality of service manager 28, 208 in FIGS. 1 and 2A).

In block 612, the memory utilization control device may perform operations including generating and sending an instruction (e.g., instruction 226 in FIG. 2A) configured to restore a bandwidth of at least one processor (e.g., processor 14, 206*a*, 206*b* in FIGS. 1 and 2A). The memory utilization control device may perform operations including interpreting the instruction to restore the bandwidth of the at least one processor, and generating and sending the instruction configured to restore the bandwidth of the at least one processor. In some embodiments, the memory utilization control device may be preconfigured with values for configuring the bandwidth for the at least one processor based on the indications of the instruction to control the bandwidth of the at least one processor. In some embodiments, the memory utilization control device may be configured with algorithms for configuring the bandwidth for the at least one processor based on the indications of the instruction to control the bandwidths of the processors. In response to receiving the instruction to restore the bandwidth of the at least one processor, the memory utilization control device may generate and send, to at least one bandwidth manager (e.g., bandwidth manager 210*a*, 210*b* in FIG. 2A), the instruction configured to restore the bandwidth of the at least one processor. In some embodiments, the instruction configured to restore the bandwidth of the at least one processor may include an indication of a level to which the bandwidth of the at least one processor should be restored, a degree by which to restore the bandwidth of the at least one processor, and/or when to restore the bandwidth of the at least one processor. The instruction configured to restore the bandwidth of the at least one processor may be configured to restore a previously reduced bandwidth of the at least one processor at least partially, up to completely, to a bandwidth greater than the reduced bandwidth, including up to a maximum bandwidth. In some embodiments, the memory utilization control device generating and sending the instruction configured to restore the bandwidth of the at least one processor in block 612 may be the quality of service manager.

Figure 6C:
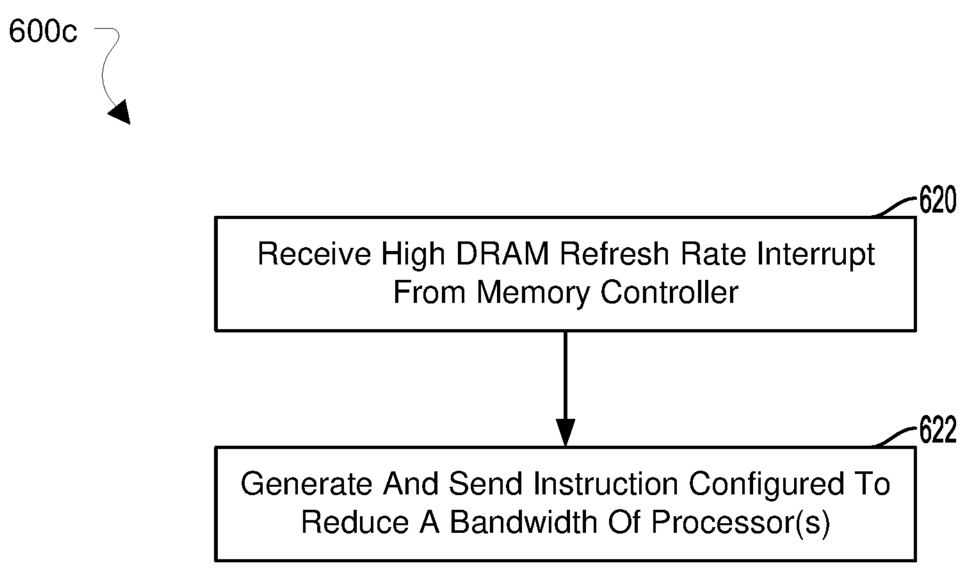

Referring to FIG. 6C, in block 620 of the method 600*c*, the memory utilization control device may perform operations including receiving a high memory refresh rate interrupt (e.g., high memory refresh rate interrupt 222 in FIG. 2B) from a memory controller (e.g., memory interface 14, memory controller 204 in FIGS. 1 and 2B). The high memory refresh rate interrupt may be the high memory refresh rate interrupt sent in block 414 of the method 400 described herein with reference to FIG. 4. In some embodiments, the memory utilization control device receiving the high memory refresh rate interrupt from the memory controller in block 620 may be a quality of service manager (e.g., quality of service manager 28, 208 in FIGS. 1 and 2B).

In block 622, the memory utilization control device may perform operations including generating and sending an instruction (e.g., instruction 226 in FIG. 2B) configured to reduce a bandwidth of at least one processor (e.g., processor 14, 206*a*, 206*b* in FIGS. 1 and 2B). The memory utilization control device may perform operations including interpreting the high memory refresh rate interrupt, and generating and sending the instruction configured to reduce a bandwidth of at least one processor. In some embodiments, the memory utilization control device may be preconfigured with values for configuring the bandwidth for the at least one processor based on the indications of the high memory refresh rate interrupt. In some embodiments, the memory utilization control device may be configured with algorithms for configuring the bandwidth for the at least one processor based on the indications of the high memory refresh rate interrupt. In response to receiving the high memory refresh rate interrupt, the memory utilization control device may generate and send, to the at least one bandwidth manager (e.g., bandwidth manager 210*a*, 210*b* in FIG. 2B), the instruction configured to reduce the bandwidth of the at least one processor. In some embodiments, instruction configured to reduce the bandwidth of the at least one processor may include an indication of a level to which the bandwidth of the at least one processor should be reduced, a degree by which to reduce the bandwidth of the at least one processor, and/or when to reduce the bandwidth of the at least one processor. In some embodiments, the memory utilization control device generating and sending the instruction configured to reduce the bandwidth of the at least one processor in block 622 may be the quality of service manager.

Figure 6D:
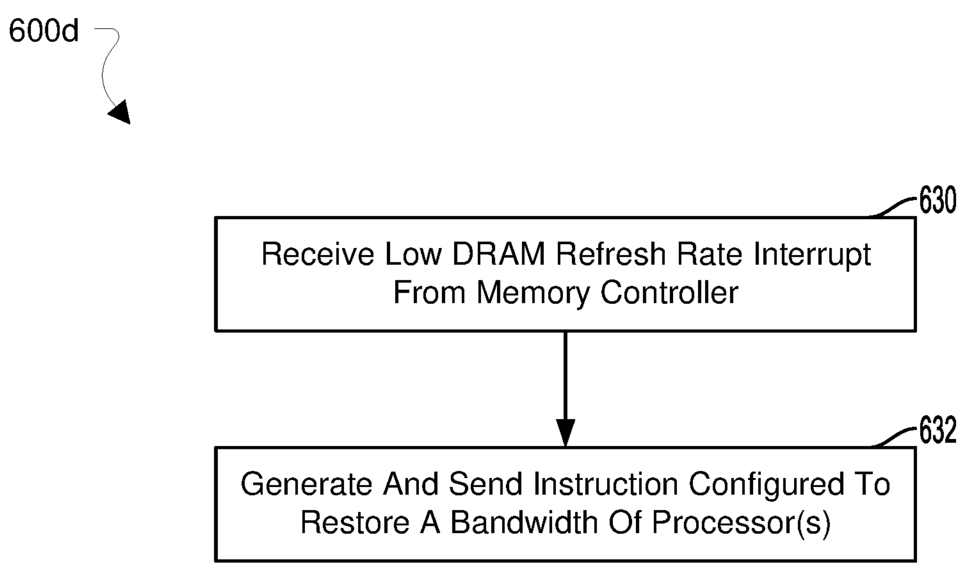

Referring to FIG. 6D, in block 630 of the method 600*d* the memory utilization control device may perform operations including receiving a low memory refresh rate interrupt (e.g., low memory refresh rate interrupt 222 in FIG. 2B) from a memory controller (e.g., memory interface 14, memory controller 204 in FIGS. 1 and 2B). The low memory refresh rate interrupt may be the low memory refresh rate interrupt sent in block 412 of the method 400 described herein with reference to FIG. 4. In some embodiments, the memory utilization control device receiving the low memory refresh rate interrupt from the memory controller in block 630 may be a quality of service manager (e.g., quality of service manager 28, 208 in FIGS. 1 and 2B).

In block 632, the memory utilization control device may perform operations including generating and sending an instruction (e.g., instruction 226 in FIG. 2B) configured to restore a bandwidth of at least one processor (e.g., processor 14, 206*a*, 206*b* in FIGS. 1 and 2B). The memory utilization control device may perform operations including interpreting the high memory refresh rate interrupt, and generating and sending the instruction configured to restore a bandwidth of at least one processor. In some embodiments, the memory utilization control device may be preconfigured with values for configuring the bandwidth for the at least one processor based on the indications of the high memory refresh rate interrupt. In some embodiments, the memory utilization control device may be configured with algorithms for configuring the bandwidth for the at least one processor based on the indications of the high memory refresh rate interrupt. In response to receiving the high memory refresh rate interrupt, the memory utilization control device may generate and send, to the at least one bandwidth manager (e.g., bandwidth manager 210*a*, 210*b* in FIG. 2B), the instruction configured to restore the bandwidth of the at least one processor. In some embodiments, the instruction configured to restore the bandwidth of the at least one processor may include an indication of a level to which the bandwidth of the at least one processor should be restored, a degree by which to restore the bandwidth of the at least one processor, and/or when to restore the bandwidth of the at least one processor. The instruction configured to restore the bandwidth of the at least one processor may be configured to restore a previously reduced bandwidth of the at least one processor at least partially, up to completely, to a bandwidth greater than the reduced bandwidth, including up to a maximum bandwidth. In some embodiments, the memory utilization control device generating and sending the instruction configured to restore the bandwidth of the at least one processor in block 632 may be the quality of service manager.

In some embodiments, the memory utilization control device may perform operations of the methods 500*a*, 500*b*, 600*a*, 600*b*, 600*c*, 600*d* for one or more memory refresh rate interrupts resulting from determinations of whether the memory refresh rate violates and/or achieves the one or more memory refresh rate thresholds in a similar manner as described for the high memory refresh rate interrupt and/or the low memory refresh rate interrupt.

Figure 7A:
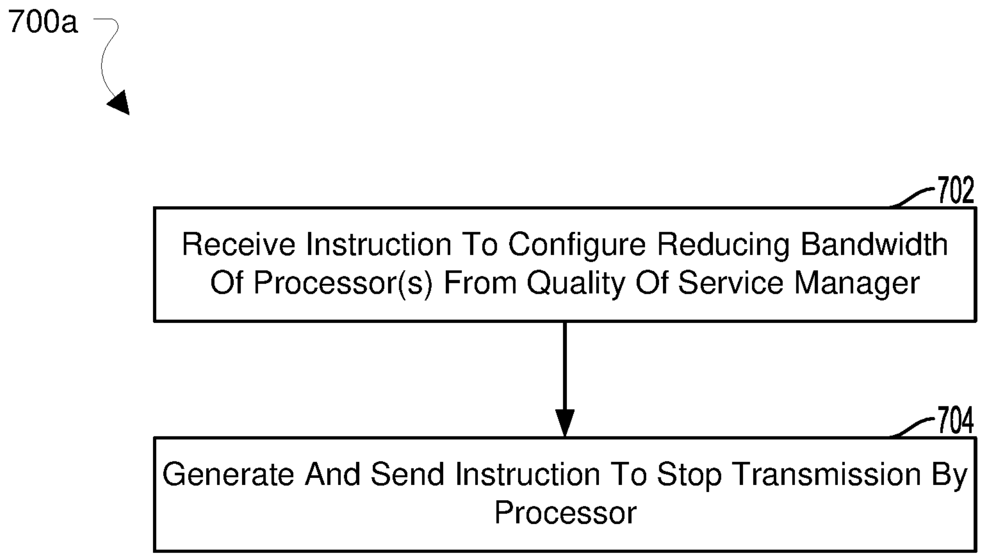
FIGS. 7A and 7B are process flow diagrams illustrating methods of memory utilization control in a bandwidth manager according to some embodiments.
Figure 7B:
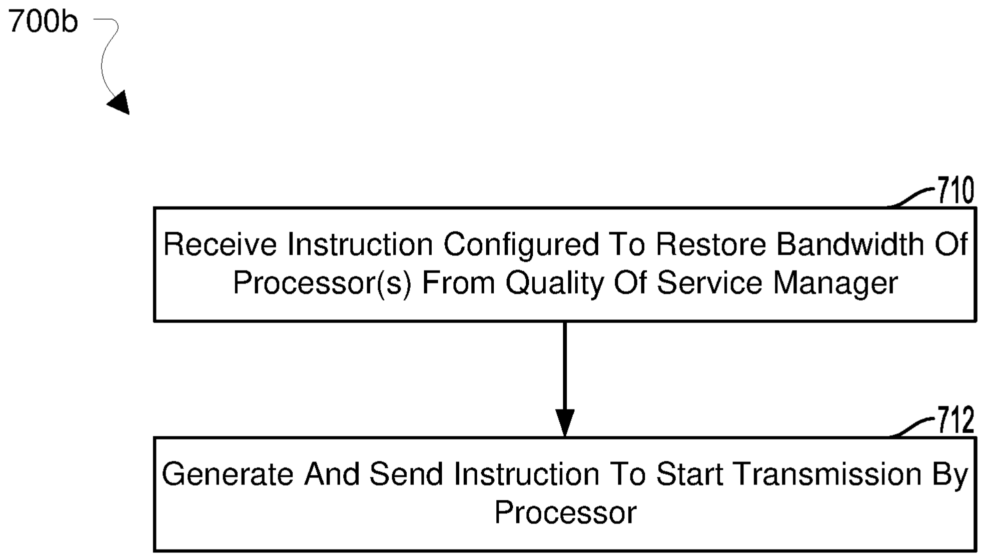

FIGS. 7A and 7B illustrate methods of memory utilization control in a bandwidth manager according to some embodiments. With reference to FIGS. 1-7B, the methods 700*a*, 700*b* may be implemented in a computing device (e.g., computing device 10 in FIG. 1), in software executing in a processor (e.g., processor 14, 206*a*, bandwidth manager 210*a*, 210*b* in FIGS. 1-2B), in general purpose hardware, in dedicated hardware (e.g., bandwidth manager 210*a*, 210*b* in FIGS. 2A and 2B), or in a combination of a software-configured processor and dedicated hardware, such as a processor executing software within a memory utilization control system (e.g., memory utilization control system 200*a*, 200*b* in FIGS. 2A and 2B) that includes other individual components, and various memory/cache controllers. In order to encompass the alternative configurations enabled in various embodiments, the hardware implementing the methods 500*a*, 500*b* is referred to herein as an "memory utilization control device."

Referring to FIG. 7A, in block 702 of the method 700*a* the memory utilization control device may perform operations including receiving an instruction (e.g., instruction 226 in FIGS. 2A and 2B) configured to reduce a bandwidth of at least one processor (e.g., processor 14, 206*a*, 206*b* in FIGS. 1-2B) from a quality of service manager (e.g., quality of service manager 28, 208 in FIGS. 1-2B). The instruction configured to reduce the bandwidth of the at least one processor may be the instruction configured to reduce the bandwidth of the at least one processor sent in blocks 604, 622 of the method 600*a*, 600*c* described with reference to FIGS. 6A and 6C. In some embodiments, the memory utilization control device receiving instruction configured to reduce the bandwidth of the at least one processor from the processor in block 702 may be a bandwidth manager (e.g., bandwidth manager 210*a*, 210*b* in FIGS. 2A and 2B).

In block 704, the memory utilization control device may perform operations including generating and sending an instruction to stop transmission by the at least one processor. The instruction to stop transmission by the at least one processor may be configured to cause the at least one processor to stop transmission to a memory (e.g., memory 16, 36, 202 in FIGS. 1-2B). In some embodiments, the memory utilization control device generating and sending an instruction to stop transmission by the at least one processor in block 704 may be the bandwidth manager.

Referring to FIG. 7B, in block 710 of the method 700*b* the memory utilization control device may perform operations including receiving an instruction (e.g., instruction 226 in FIGS. 2A and 2B) configured to restore a bandwidth of at least one processor (e.g., processor 14, 206*a*, 206*b* in FIGS. 1-2B) from a quality of service manager (e.g., quality of service manager 28, 208 in FIGS. 1-2B). The instruction configured to restore the bandwidth of the at least one processor may be the instruction configured to restore the bandwidth of the at least one processor sent in blocks 612, 632 of the method 600*b*, 600*d* described herein with reference to FIGS. 6B and 6D. In some embodiments, the memory utilization control device receiving instruction configured to restore the bandwidth of the at least one processor from the processor in block 710 may be a bandwidth manager (e.g., bandwidth manager 210*a*, 210*b* in FIGS. 2A and 2B).

In block 712, the memory utilization control device may perform operations including generating and sending an instruction to start transmission by the at least one processor. The instruction to start transmission by the at least one processor may be configured to cause the at least one processor to start transmission to a memory (e.g., memory 16, 36, 202 in FIGS. 1-2B). In some embodiments, the memory utilization control device generating and sending an instruction to start transmission by the at least one processor in block 704 may be the bandwidth manager.

Figure 8:
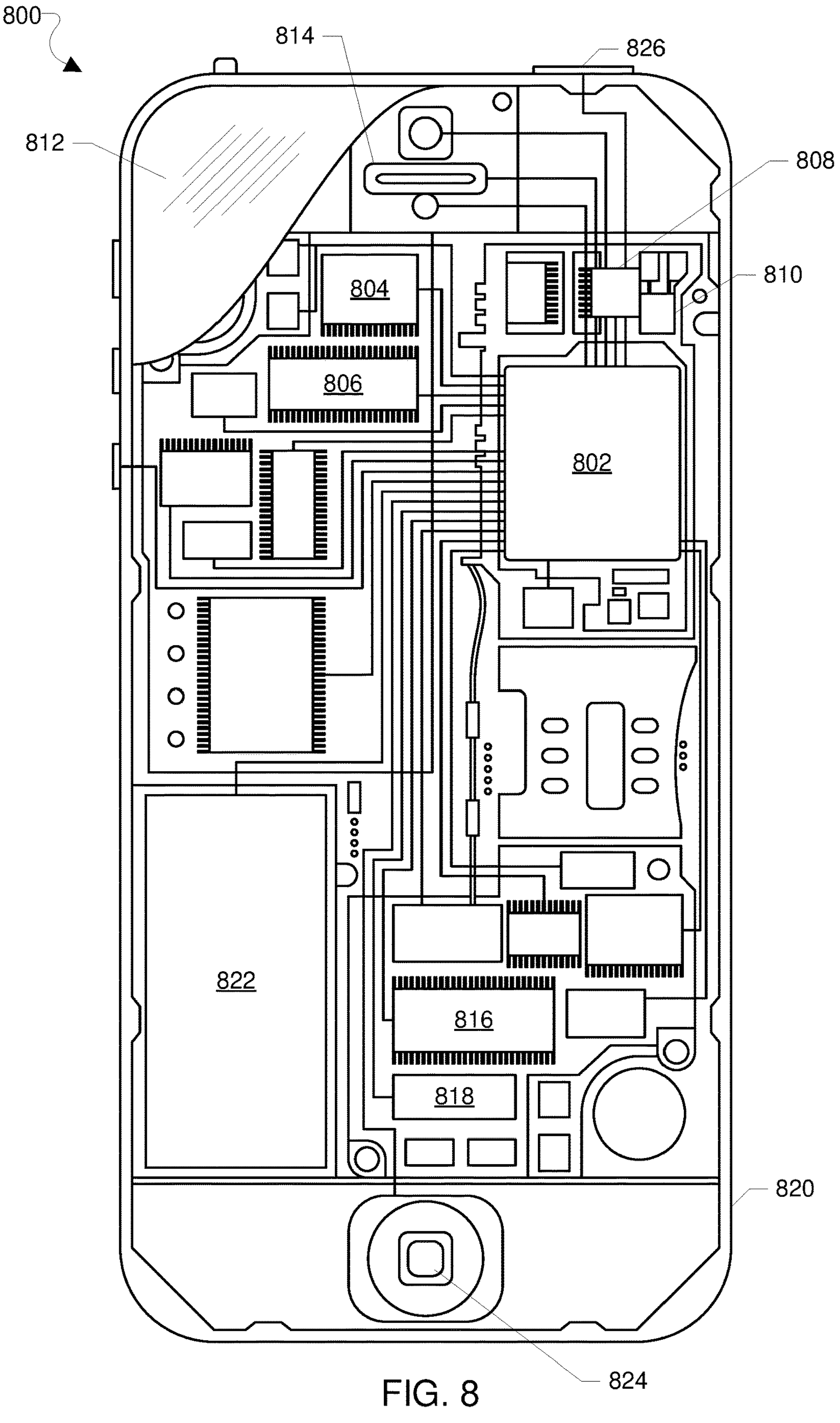
FIG. 8 is a component block diagram illustrating an example mobile computing device suitable for implementing various embodiments.

Various embodiments (including, but not limited to, embodiments described above with reference to FIGS. 1-7B) may be implemented in a wide variety of computing systems including mobile computing devices, an example of which suitable for use with the various embodiments is illustrated in FIG. 8. The mobile computing device 800 may include a processor 802 coupled to a touchscreen controller 804 and an internal memory 806. The processor 802 may be one or more multicore integrated circuits designated for general or specific processing tasks. The internal memory 806 may be volatile or non-volatile memory and may also be secure and/or encrypted memory, or unsecure and/or unencrypted memory, or any combination thereof. Examples of memory types that can be leveraged include but are not limited to DDR, LPDDR, GDDR, WIDEIO, RAM, SRAM, DRAM, P-RAM, R-RAM, M-RAM, STT-RAM, and embedded DRAM. The touchscreen controller 804 and the processor 802 may also be coupled to a touchscreen panel 812, such as a resistive-sensing touchscreen, capacitive-sensing touchscreen, infrared sensing touchscreen, etc. Additionally, the display of the mobile computing device 800 need not have touch screen capability.

The mobile computing device 800 may have one or more radio signal transceivers 808 (e.g., Peanut, Bluetooth, ZigBee, Wi-Fi, RF radio) and antennae 810, for sending and receiving communications, coupled to each other and/or to the processor 802. The transceivers 808 and antennae 810 may be used with the above-mentioned circuitry to implement the various wireless transmission protocol stacks and interfaces. The mobile computing device 800 may include a cellular network wireless modem chip 816 that enables communication via a cellular network and is coupled to the processor 802.

The mobile computing device 800 may include a peripheral device connection interface 818 coupled to the processor 802. The peripheral device connection interface 818 may be singularly configured to accept one type of connection or may be configured to accept various types of physical and communication connections, common or proprietary, such as Universal Serial Bus (USB), FireWire, Thunderbolt, or PCIe. The peripheral device connection interface 818 may also be coupled to a similarly configured peripheral device connection port (not shown).

The mobile computing device 800 may also include speakers 814 for providing audio outputs. The mobile computing device 800 may also include a housing 820, constructed of a plastic, metal, or a combination of materials, for containing all or some of the components described herein. The mobile computing device 800 may include a power source 822 coupled to the processor 802, such as a disposable or rechargeable battery. The rechargeable battery may also be coupled to the peripheral device connection port to receive a charging current from a source external to the mobile computing device 800. The mobile computing device 800 may also include a physical button 824 for receiving user inputs. The mobile computing device 800 may also include a power button 826 for turning the mobile computing device 800 on and off.

Figure 9:
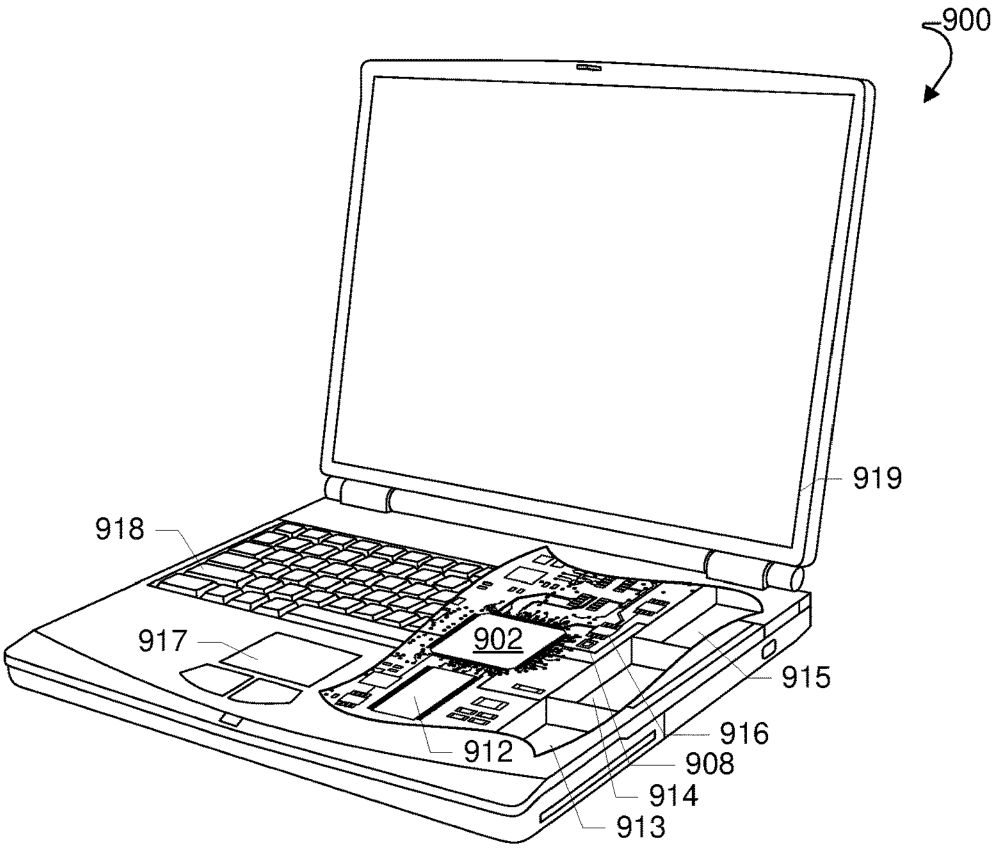
FIG. 9 is a component block diagram illustrating an example mobile computing device suitable for implementing various embodiments.

The various embodiments (including, but not limited to, embodiments described above with reference to FIGS. 1-7B) may be implemented in a wide variety of computing systems including a laptop computer 900 an example of which is illustrated in FIG. 9. Many laptop computers include a touchpad touch surface 917 that serves as the computer's pointing device, and thus may receive drag, scroll, and flick gestures similar to those implemented on computing devices equipped with a touch screen display and described above. A laptop computer 900 will typically include a processor 902 coupled to volatile memory 912 and a large capacity nonvolatile memory, such as a disk drive 913 of Flash memory. Additionally, the computer 900 may have one or more antenna 908 for sending and receiving electromagnetic radiation that may be connected to a wireless data link and/or cellular telephone transceiver 916 coupled to the processor 902. The computer 900 may also include a floppy disc drive 914 and a compact disc (CD)

drive 915 coupled to the processor 902. In a notebook configuration, the computer housing includes the touchpad 917, the keyboard 918, and the display 919 all coupled to the processor 902. Other configurations of the computing device may include a computer mouse or trackball coupled to the processor 902 (e.g., via a USB input) as are well known, which may also be used in conjunction with the various embodiments.

Figure 10:
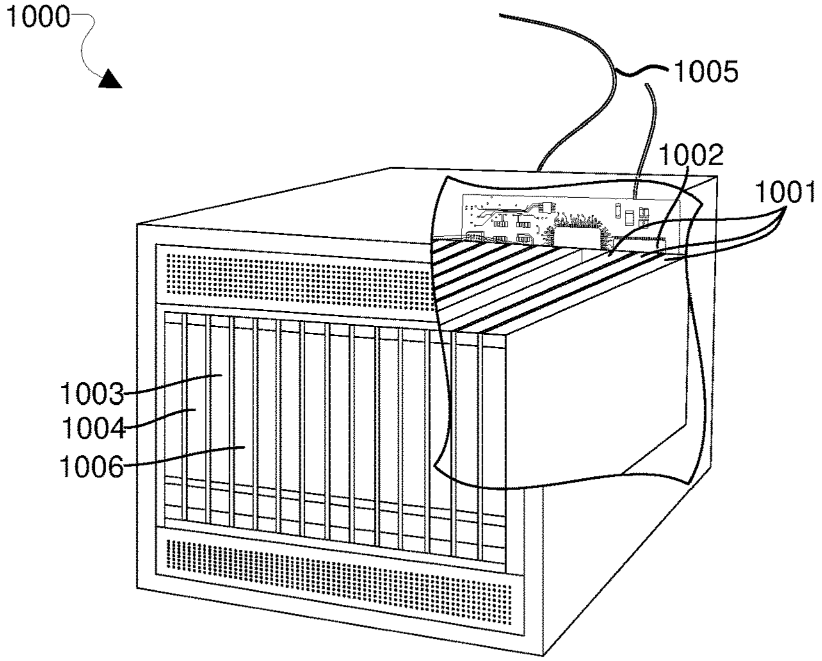
FIG. 10 is a component block diagram illustrating an example server suitable for implementing various embodiments.

The various embodiments (including, but not limited to, embodiments described above with reference to FIGS. 1-7B) may also be implemented in fixed computing systems, such as any of a variety of commercially available servers. An example server 1000 is illustrated in FIG. 10. Such a server 1000 typically includes one or more multicore processor assemblies 1001 coupled to volatile memory 1002 and a large capacity nonvolatile memory, such as a disk drive 1004. As illustrated in FIG. 10, multicore processor assemblies 1001 may be added to the server 1000 by inserting them into the racks of the assembly. The server 1000 may also include a floppy disc drive, compact disc (CD) or digital versatile disc (DVD) disc drive 1006 coupled to the processor 1001. The server 1000 may also include network access ports 1003 coupled to the multicore processor assemblies 1001 for establishing network interface connections with a network 1005, such as a local area network coupled to other broadcast system computers and servers, the Internet, the public switched telephone network, and/or a cellular data network (e.g., CDMA, TDMA, GSM, PCS, 3G, 4G, 5G, LTE, or any other type of cellular data network).

Computer program code or "program code" for execution on a programmable processor for carrying out operations of the various embodiments may be written in a high-level programming language such as C, C++, C #, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

Implementation examples are described in the following paragraphs. While some of the following implementation examples are described in terms of example systems, devices, or methods, further example implementations may include: the example systems or devices discussed in the following paragraphs implemented as a method executing operations of the example systems or devices, the example systems, devices, or methods discussed in the following paragraphs implemented by a computing device comprising an inline cryptographic module configured to perform operations of the example systems, devices, or methods; the example systems, devices, or methods discussed in the following paragraphs implemented by a computing device comprising a processing device configured with processing device-executable instructions to perform operations of the example systems, devices, or methods; a computing device including means for performing functions of the example systems, devices, or methods; and the example systems, devices, or methods discussed in the following paragraphs implemented as a non-transitory processor-readable storage medium having stored thereon processor-executable instructions configured to cause a processor of a computing device to perform the operations of the example systems, devices, or methods.

Example 1. A method implemented in a system on chip (SoC) for memory utilization control, including: controlling bandwidth of at least one processor based on a refresh rate of a memory.

Example 2. The method of example 1, further including: receiving the refresh rate of the memory at a memory controller; and determining whether the refresh rate of the memory violates a high memory refresh rate threshold, in which controlling the bandwidth of the at least one processor based on the refresh rate of the memory includes sending, by a quality of service manager, an instruction configured to reduce the bandwidth of the at least one processor in response to determining that the refresh rate of the memory violates the high memory refresh rate threshold.

Example 3. The method of example 2, in which controlling the bandwidth of the at least one processor based on the refresh rate of the memory further includes: sending a high memory refresh rate interrupt from the memory controller in response to determining that the refresh rate of the memory violates the high memory refresh rate threshold; and sending, by one of the at least one processor, an instruction configured to reduce the bandwidth of the at least one processor in response to the high memory refresh rate interrupt, in which sending, by the quality of service manager, the instruction configured to reduce the bandwidth of the at least one processor includes sending, by the quality of service manager, the instruction configured to reduce the bandwidth of the at least one processor in response to the instruction to reduce the bandwidth of the at least one processor from the one of the at least one processor.

Example 4. The method of example 2, in which controlling the bandwidth of the at least one processor based on the refresh rate of the memory further includes: sending a high memory refresh rate interrupt from the memory controller in response to determining that the refresh rate of the memory violates the high memory refresh rate threshold, in which sending the instruction configured to reduce the bandwidth of the at least one processor includes sending the instruction configured to reduce the bandwidth of the at least one processor in response to the high memory refresh rate interrupt.

Example 5. The method of any of examples 1-4, further including: receiving the refresh rate of the memory at a memory controller; and determining whether the refresh rate of the memory achieves a low memory refresh rate threshold, in which controlling the bandwidth of the at least one processor based on the refresh rate of the memory including sending, by a quality of service manager, an instruction configured to restore the bandwidth of the at least one processor in response to determining that the refresh rate of the memory achieves the low memory refresh rate threshold.

Example 6. The method of example 5, in which controlling the bandwidth of the at least one processor based on the refresh rate of the memory further includes: sending a low memory refresh rate interrupt from the memory controller in response to determining that the refresh rate of the memory achieves the low memory refresh rate threshold; and sending, by one of the at least one processor, an instruction configured to restore the bandwidth of the at least one processor in response to the low memory refresh rate interrupt, in which sending, by the quality of service manager, the instruction configured to restore the bandwidth of the at least one processor includes sending, by the quality of service manager, the instruction configured to restore the bandwidth of the at least one processor in response to the instruction to restore the bandwidth of the at least one processor from the one of the at least one processor.

Example 7. The method of example 5, in which: controlling the bandwidth of the at least one processor based on the refresh rate of the memory further includes sending a low memory refresh rate interrupt from the memory controller in response to determining that the refresh rate of the memory achieves the low memory refresh rate threshold, in which sending the instruction configured to restore the bandwidth of the at least one processor includes sending the instruction configured to restore the bandwidth of the at least one processor in response to the low memory refresh rate interrupt.

Example 8. The method of example 5, in which controlling the bandwidth of the at least one processor based on the refresh rate of the memory further includes: determining whether a high temperature interrupt is set; and sending a low memory refresh rate interrupt from the memory controller in response to determining that the refresh rate of the memory achieves the low memory refresh rate threshold and that the high temperature interrupt is set.

The foregoing method descriptions and the process flow diagrams are provided merely as illustrative examples and are not intended to require or imply that the operations of the various embodiments must be performed in the order presented. The order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various embodiments may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments and implementations without departing from the scope of the claims. Thus, the present disclosure is not intended to be limited to the embodiments and implementations described herein but is to be accorded the widest scope consistent with the following claims and the principles and novel features disclosed herein.

What is claimed is:

1. A method implemented in a system on chip (SoC) for memory utilization control, comprising:

controlling bandwidth of at least one processor based on an indication of a refresh rate of a memory from a signal from the memory.

2. The method of claim 1, further comprising:

receiving the indication of the refresh rate of the memory from the signal from the memory at a memory controller; and determining whether the refresh rate of the memory violates a high memory refresh rate threshold, wherein controlling the bandwidth of the at least one processor based on the indication of the refresh rate of the memory from the signal from the memory comprises sending, by a quality of service manager, an instruction configured to reduce the bandwidth of the at least one processor in response to determining that the refresh rate of the memory violates the high memory refresh rate threshold.

3. The method of claim 2, wherein controlling the bandwidth of the at least one processor based on the indication of the refresh rate of the memory from the signal from the memory further comprises:

sending a high memory refresh rate interrupt from the memory controller in response to determining that the refresh rate of the memory violates the high memory refresh rate threshold; and sending, by one of the at least one processor, an instruction configured to reduce the bandwidth of the at least one processor in response to the high memory refresh rate interrupt, wherein sending, by the quality of service manager, the instruction configured to reduce the bandwidth of the at least one processor comprises sending, by the quality of service manager, the instruction configured to reduce the bandwidth of the at least one processor in response to the instruction to reduce the bandwidth of the at least one processor from the one of the at least one processor.

4. The method of claim 2, wherein controlling the bandwidth of the at least one processor based on the indication of the refresh rate of the memory from the signal from the memory further comprises:

sending a high memory refresh rate interrupt from the memory controller in response to determining that the refresh rate of the memory violates the high memory refresh rate threshold, wherein sending the instruction configured to reduce the bandwidth of the at least one processor comprises sending the instruction configured to reduce the bandwidth of the at least one processor in response to the high memory refresh rate interrupt.

5. The method of claim 1, further comprising:

receiving the indication of the refresh rate of the memory from the signal from the memory at a memory controller; and determining whether the refresh rate of the memory achieves a low memory refresh rate threshold, wherein controlling the bandwidth of the at least one processor based on the indication of the refresh rate of the memory from the signal from the memory comprises sending, by a quality of service manager, an instruction configured to restore the bandwidth of the at least one processor in response to determining that the refresh rate of the memory achieves the low memory refresh rate threshold.

6. The method of claim 5, wherein controlling the bandwidth of the at least one processor based on the indication of the refresh rate of the memory from the signal from the memory further comprises:

sending a low memory refresh rate interrupt from the memory controller in response to determining that the refresh rate of the memory achieves the low memory refresh rate threshold; and sending, by one of the at least one processor, an instruction configured to restore the bandwidth of the at least one processor in response to the low memory refresh rate interrupt, wherein sending the instruction, by the quality of service manager, configured to restore the bandwidth of the at least one processor comprises sending, by the quality of service manager, the instruction configured to restore the bandwidth of the at least one processor in response to the instruction to restore the bandwidth of the at least one processor from the one of the at least one processor.

7. The method of claim 5, wherein controlling the bandwidth of the at least one processor based on the indication of the refresh rate of the memory from the signal from the memory comprises sending a low memory refresh rate interrupt from the memory controller in response to determining that the refresh rate of the memory achieves the low memory refresh rate threshold, wherein sending the instruction configured to restore the bandwidth of the at least one processor comprises sending the instruction configured to restore the bandwidth of the at least one processor in response to the low memory refresh rate interrupt.

8. The method of claim 5, wherein controlling the bandwidth of the at least one processor based on the indication of the refresh rate of the memory from the signal from the memory further comprises:

determining whether a high temperature interrupt is set; and sending a low memory refresh rate interrupt from the memory controller in response to determining that the refresh rate of the memory achieves the low memory refresh rate threshold and that the high temperature interrupt is set.

9. A system on chip (SoC), comprising:

a memory;

at least one processor coupled to the memory; and a memory utilization control system coupled to the at least one processor and the memory, wherein the memory utilization control system is configured to control bandwidth of the at least one processor based on an indication of a refresh rate of the memory from a signal from the memory.

10. The SoC of claim 9, wherein the memory utilization control system comprises:

a memory controller coupled to the memory, wherein the memory controller is configured to:

receive the indication of the refresh rate of the memory from the signal from the memory; and determine whether the refresh rate of the memory violates a high memory refresh rate threshold; and a quality of service manager configured to send an instruction configured to reduce the bandwidth of the at least one processor in response to the memory controller determining that the refresh rate of the memory violates the high memory refresh rate threshold.

11. The SoC of claim 10, wherein:

the memory controller is further configured to send a high memory refresh rate interrupt in response to determining that the refresh rate of the memory violates the high memory refresh rate threshold;

one of the at least one processor is configured to send an instruction configured to reduce the bandwidth of the at least one processor in response to the high memory refresh rate interrupt; and the quality of service manager is further configured to send the instruction configured to reduce the bandwidth of the at least one processor in response to the instruction to reduce the bandwidth of the at least one processor from the one of the at least one processor.

12. The SoC of claim 10, wherein:

the memory controller is further configured to send a high memory refresh rate interrupt in response to determining that the refresh rate of the memory violates the high memory refresh rate threshold; and the quality of service manager is further configured to send the instruction configured to reduce the bandwidth of the at least one processor in response to the high memory refresh rate interrupt.

13. The SoC of claim 9, wherein the memory utilization control system comprises:

a memory controller coupled to the memory, wherein the memory controller is configured to:

receive the indication of the refresh rate of the memory from the signal from the memory; and determine whether the refresh rate of the memory achieves a low memory refresh rate threshold; and a quality of service manager configured to send an instruction configured to restore the bandwidth of the at least one processor in response to the memory controller determining that the refresh rate of the memory achieves the low memory refresh rate threshold.

14. The SoC of claim 13, wherein:

the memory controller is further configured to send a low memory refresh rate interrupt in response to determining that the refresh rate of the memory achieves the low memory refresh rate threshold;

one of the at least one processor is configured to send an instruction configured to restore the bandwidth of the at least one processor in response to the low memory refresh rate interrupt; and the quality of service manager is further configured to send the instruction configured to restore the bandwidth of the at least one processor in response to the instruction to restore the bandwidth of the at least one processor from the one of the at least one processor.

15. The SoC of claim 13, wherein:

the memory controller is further configured to send a low memory refresh rate interrupt in response to determining that the refresh rate of the memory achieves the low memory refresh rate threshold; and the quality of service manager is further configured to send the instruction configured to restore the bandwidth of the at least one processor in response to the low memory refresh rate interrupt.

16. The SoC of claim 13 wherein the memory controller is further configured to:

determine whether a high temperature interrupt is set; and send a low memory refresh rate interrupt in response to determining that the refresh rate of the memory achieves the low memory refresh rate threshold and that the high temperature interrupt is set.

17. A computing device, comprising:

means for controlling bandwidth of at least one processor based on an indication of a refresh rate of a memory from a signal from the memory.

18. The computing device of claim 17, comprising:

means for receiving the indication of the refresh rate of the memory from the signal from the memory; and means for determining whether the refresh rate of the memory violates a high memory refresh rate threshold, wherein means for controlling the bandwidth of the at least one processor based on the indication of the refresh rate of the memory from the signal from the memory comprises means for sending a first instruction configured to reduce the bandwidth of the at least one processor in response to determining that the refresh rate of the memory violates the high memory refresh rate threshold.

19. The computing device of claim 18, wherein means for controlling the bandwidth of the at least one processor based on the indication of the refresh rate of the memory from the signal from the memory further comprises:

means for sending a high memory refresh rate interrupt in response to determining that the refresh rate of the memory violates the high memory refresh rate threshold; and means for sending a second instruction configured to reduce the bandwidth of the at least one processor in response to the high memory refresh rate interrupt, wherein means for sending the first instruction configured to reduce the bandwidth of the at least one processor comprises means for sending the first instruction configured to reduce the bandwidth of the at least one processor in response to the second instruction to reduce the bandwidth of the at least one processor.

20. The computing device of claim 18, wherein means for controlling the bandwidth of the at least one processor based on the indication of the refresh rate of the memory from the signal from the memory further comprises:

means for sending a high memory refresh rate interrupt in response to determining that the refresh rate of the memory violates the high memory refresh rate threshold, wherein means for sending the first instruction configured to reduce the bandwidth of the at least one processor comprises means for sending the first instruction configured to reduce the bandwidth of the at least one processor in response to the high memory refresh rate interrupt.

21. The computing device of claim 17, further comprising:

means for receiving the indication of the refresh rate of the memory from the signal from the memory; and means for determining whether the refresh rate of the memory achieves a low memory refresh rate threshold, wherein means for controlling the bandwidth of the at least one processor based on the indication of the refresh rate of the memory from the signal from the memory comprises means for sending a first instruction configured to restore the bandwidth of the at least one processor in response to determining that the refresh rate of the memory achieves the low memory refresh rate threshold.

22. The computing device of claim 21, wherein means for controlling the bandwidth of the at least one processor based on the indication of the refresh rate of the memory from the signal from the memory further comprises:

means for sending a low memory refresh rate interrupt in response to determining that the refresh rate of the memory achieves the low memory refresh rate threshold; and means for sending a second instruction configured to restore the bandwidth of the at least one processor in response to the low memory refresh rate interrupt, wherein means for sending the first instruction configured to restore the bandwidth of the at least one processor comprises means for sending the first instruction configured to restore the bandwidth of the at least one processor in response to the second instruction to restore the bandwidth of the at least one processor.

23. The computing device of claim 21, wherein means for controlling the bandwidth of the at least one processor based on the indication of the refresh rate of the memory from the signal from the memory configured to indicate on the refresh rate of the memory further comprises means for sending a low memory refresh rate interrupt in response to determining that the refresh rate of the memory achieves the low memory refresh rate threshold, wherein means for sending the first instruction configured to restore the bandwidth of the at least one processor comprises means for sending the first instruction configured to restore the bandwidth of the at least one processor in response to the low memory refresh rate interrupt.

24. The computing device of claim 21, wherein means for controlling the bandwidth of the at least one processor based on the indication of the refresh rate of the memory from the signal from the memory further comprises:

means for determining whether a high temperature interrupt is set; and means for sending a low memory refresh rate interrupt in response to determining that the refresh rate of the memory achieves the low memory refresh rate threshold and that the high temperature interrupt is set.

25. A non-transitory, processor-readable medium having stored thereon processor-executable instructions configured to cause a processor to perform operations comprising:

controlling bandwidth of at least one processor based on an indication of a refresh rate of a memory from a signal from the memory.

26. The non-transitory, processor-readable medium of claim 25, wherein the stored processor-executable instructions are configured to cause the processor to perform operations further comprising:

receiving the indication of the refresh rate of the memory from the signal from the memory; and determining whether the refresh rate of the memory violates a high memory refresh rate threshold, wherein controlling the bandwidth of the at least one processor based on the indication of the refresh rate of the memory from the signal from the memory comprises sending a first instruction configured to reduce the bandwidth of the at least one processor in response to determining that the refresh rate of the memory violates the high memory refresh rate threshold.

27. The non-transitory, processor-readable medium of claim 26, wherein the stored processor-executable instructions are configured to cause the processor to perform operations such that wherein controlling the bandwidth of the at least one processor based on the indication of the refresh rate of the memory from the signal from the memory comprises:

sending a high memory refresh rate interrupt in response to determining that the refresh rate of the memory violates the high memory refresh rate threshold; and sending a second instruction configured to reduce the bandwidth of the at least one processor in response to the high memory refresh rate interrupt, wherein sending the first instruction configured to reduce the bandwidth of the at least one processor comprises sending the first instruction configured to reduce the bandwidth of the at least one processor in response to the second instruction to reduce the bandwidth of the at least one processor.

28. The non-transitory, processor-readable medium of claim 26, wherein the stored processor-executable instructions are configured to cause the processor to perform operations such that wherein controlling the bandwidth of the at least one processor based on the indication of the refresh rate of the memory from the signal from the memory comprises:

sending a high memory refresh rate interrupt in response to determining that the refresh rate of the memory violates the high memory refresh rate threshold, wherein sending the first instruction configured to reduce the bandwidth of the at least one processor comprises sending the first instruction configured to reduce the bandwidth of the at least one processor in response to the high memory refresh rate interrupt.

29. The non-transitory, processor-readable medium of claim 25, wherein the stored processor-executable instructions are configured to cause the processor to perform operations further comprising:

receiving the indication of the refresh rate of the memory from the signal from the memory; and determining whether the refresh rate of the memory achieves a low memory refresh rate threshold, wherein controlling the bandwidth of the at least one processor based on the indication of the refresh rate of the memory from the signal from the memory comprises sending a first instruction configured to restore the bandwidth of the at least one processor in response to determining that the refresh rate of the memory achieves the low memory refresh rate threshold.

30. The non-transitory, processor-readable medium of claim 29, wherein the stored processor-executable instructions are configured to cause the processor to perform operations such that wherein controlling the bandwidth of the at least one processor based on the indication of the refresh rate of the memory from the signal from the memory comprises:

sending a low memory refresh rate interrupt in response to determining that the refresh rate of the memory achieves the low memory refresh rate threshold; and sending a second instruction configured to restore the bandwidth of the at least one processor in response to the low memory refresh rate interrupt, wherein sending the first instruction configured to restore the bandwidth of the at least one processor comprises sending the first instruction configured to restore the bandwidth of the at least one processor in response to the second instruction to restore the bandwidth of the at least one processor.

* * * * *